United States Patent
Nakamura et al.

(10) Patent No.: US 10,895,456 B1
(45) Date of Patent: Jan. 19, 2021

(54) THREE-DIMENSIONAL SURVEY APPARATUS, THREE-DIMENSIONAL SURVEY METHOD, AND THREE-DIMENSIONAL SURVEY PROGRAM

(71) Applicant: Topcon Corporation, Tokyo (JP)

(72) Inventors: Keisuke Nakamura, Tokyo (JP); Yoshihiro Nishi, Tokyo (JP)

(73) Assignee: Topcon Corporation, Tokyo (JP)

( * ) Notice: Subject to any disclaimer, the term of this patent is extended or adjusted under 35 U.S.C. 154(b) by 0 days.

(21) Appl. No.: 16/923,135

(22) Filed: Jul. 8, 2020

(30) Foreign Application Priority Data

Jul. 18, 2019 (JP) .................................. 2019-132776

(51) Int. Cl.
*G01C 3/04* (2006.01)
*G01C 15/00* (2006.01)

(52) U.S. Cl.
CPC .............. *G01C 3/04* (2013.01); *G01C 15/002* (2013.01); *G01C 15/008* (2013.01)

(58) Field of Classification Search
CPC ....... G01C 15/00; G01C 15/002; G01S 17/42; G01S 5/0284; G01B 11/002
See application file for complete search history.

(56) References Cited

U.S. PATENT DOCUMENTS

| | | | | |
|---|---|---|---|---|
| 6,140,957 A | * | 10/2000 | Wilson | G01C 15/00 342/357.32 |
| 8,705,893 B1 | * | 4/2014 | Zhang | G06T 7/74 382/285 |
| 9,462,108 B2 | * | 10/2016 | Ko | H04W 4/029 |
| 2015/0253124 A1 | * | 9/2015 | Steffey | G01B 11/002 356/614 |
| 2015/0268033 A1 | * | 9/2015 | Troy | G01S 5/0284 702/95 |
| 2016/0291160 A1 | * | 10/2016 | Zweigle | G01S 17/42 |
| 2018/0136336 A1 | | 5/2018 | Walsh et al. | |
| 2018/0158200 A1 | * | 6/2018 | Metzler | G06T 7/38 |

* cited by examiner

*Primary Examiner* — Luke D Ratcliffe
(74) *Attorney, Agent, or Firm* — Chiesa Shahinian & Giantomasi PC

(57) ABSTRACT

A three-dimensional survey apparatus includes a collimating ranging unit, a scanner unit, and a control calculation portion. The control calculation portion stores coordinates of a machine reference point of the collimating ranging unit and a direction of a reference collimation of a telescope portion, stores first point group data, stores a direction of a first collimation of the telescope portion oriented from the movement source position toward a movement destination position, stores a direction of a second collimation of the telescope portion oriented from the movement destination position toward the movement source position and a movement distance, calculates and stores coordinates of the machine reference point at the movement destination position with the survey start position as a reference based on the direction of the first collimation, the direction of the second collimation, and the movement distance, and stores second point group data.

5 Claims, 12 Drawing Sheets

THREE-DIMENSIONAL SURVEY APPARATUS, THREE-DIMENSIONAL SURVEY METHOD, AND THREE-DIMENSIONAL SURVEY PROGRAM

CROSS-REFERENCE TO RELATED APPLICATION

This application claims priority to Japanese Patent Application No. 2019-132776, filed Jul. 18, 2019, the disclosure of which is incorporated herein by reference in its entirety.

FIELD

The present invention relates to a three-dimensional survey apparatus, a three-dimensional survey method, and a three-dimensional survey program which acquire three-dimensional data of a measurement object.

BACKGROUND

Generally, there are three-dimensional survey apparatuses for acquiring three-dimensional data of a measurement object such as an architectural structure. Three-dimensional data acquired by a three-dimensional survey apparatus is used to generate a drawing, a three-dimensional model, or the like. When a measurement object is relatively large as in the case of an architectural structure, a three-dimensional survey apparatus cannot acquire three-dimensional data of the entire measurement object from one position. For example, a three-dimensional survey apparatus is incapable of acquiring three-dimensional data of a wall surface on a rear side of the architectural structure which cannot be collimated from a position where the three-dimensional survey apparatus is installed. Therefore, in such a case, a worker moves the three-dimensional survey apparatus and acquires three-dimensional data of the entire measurement object by acquiring three-dimensional data of the measurement object from each of a plurality of mutually different positions.

In addition, for example, three-dimensional data (point group data) of the entire measurement object is input to another computer or the like which differs from the three-dimensional survey apparatus, and registration that involves positioning pieces of three-dimensional data (point group data) acquired at the plurality of mutually different positions is performed by the other computer. Accordingly, a three-dimensional model of the entire measurement object such as an architectural structure is generated based on the pieces of three-dimensional data acquired at a plurality of mutually different positions.

U.S. Patent Application Publication No. 2018/0136336 discloses a method of acquiring one or more background images using a plurality of cameras included in a laser scanner and estimating an arrangement of a second position relative to a first position. Specifically, with the method described in U.S. Patent Application Publication No. 2018/0136336, an arrangement of a second position relative to a first position is estimated based on tracking of one or more features in a plurality of images acquired by the plurality of cameras of the laser scanner while the laser scanner moves away from the first position and on an association between the one or more features and scan point data. Scan point data is acquired from a scan of a background by a laser of the laser scanner while the laser scanner is at the first position.

However, when a deviation between relative positions of a same location of the measurement object is large and when a deviation between relative angles of an inclination of the measurement object is large among pieces of three-dimensional data acquired at a plurality of mutually different positions, registration may require a relatively long processing time or the registration may be incompletable. In addition, in order to reduce processing time of the registration or to more reliably complete the registration, relative positions of a same location of the measurement object and relative angles of an inclination of the measurement object among pieces of three-dimensional data acquired at a plurality of mutually different positions may be manually aligned to a certain degree.

As described above, there is a problem in that, when a deviation between relative positions of a same location of the measurement object is large and when a deviation between relative angles of an inclination of the measurement object is large among pieces of three-dimensional data acquired at a plurality of mutually different positions, registration of point group data may be time-consuming or labor-intensive

SUMMARY

The present invention has been made in order to solve the problem described above and an object thereof is to provide a three-dimensional survey apparatus, a three-dimensional survey method, and a three-dimensional survey program which enable registration of point group data to be executed in an efficient manner.

The problem described above is solved by a three-dimensional survey apparatus according to the present invention which acquires three-dimensional data of a measurement object, the three-dimensional survey apparatus including: a collimating ranging unit which irradiates the measurement object with first ranging light by collimation of a telescope portion to measure a distance to the measurement object and to detect a direction of the collimation; a scanner unit which is integrally provided with the collimating ranging unit and rotatably provided relative to the collimating ranging unit and which acquires point group data with respect to the measurement object by performing rotational irradiation with second ranging light to measure a distance to the measurement object and to detect an irradiation direction of the second ranging light; and a control calculation portion which is provided in at least one of the collimating ranging unit and the scanner unit, wherein the control calculation portion stores coordinates of a machine reference point of the collimating ranging unit and a direction of a reference collimation of the telescope portion by a backsight at a survey start position, stores first point group data acquired at a movement source position by controlling the scanner unit, stores a direction of a first collimation of the telescope portion oriented from the movement source position toward a movement destination position, stores a direction of a second collimation of the telescope portion oriented from the movement destination position toward the movement source position and a movement distance between the movement source position and the movement destination position, calculates and stores coordinates of the machine reference point at the movement destination position with the survey start position as a reference based on the direction of the first collimation, the direction of the second collimation, and the movement distance, and stores second point group data acquired at the movement destination position by controlling the scanner unit.

With the three-dimensional survey apparatus according to the present invention, first, the control calculation portion stores coordinates of a machine reference point of the collimating ranging unit and a direction of a reference collimation of the telescope portion of the collimating ranging unit by a backsight at a survey start position. Next, the control calculation portion stores first point group data acquired at a movement source position prior to moving the three-dimensional survey apparatus by controlling the scanner unit. Next, the control calculation portion stores a direction of a first collimation of the telescope portion oriented from the movement source position toward a movement destination position after moving the three-dimensional survey apparatus. The telescope portion is to be oriented from the movement source position toward the movement destination position by a worker or the like.

In this case, the movement source position refers to a survey position before moving the three-dimensional survey apparatus. Therefore, the movement source position includes a survey start position. In other words, when the worker or the like moves the three-dimensional survey apparatus for the first time after starting a survey at the survey start position, the survey start position corresponds to the movement source position.

Next, the control calculation portion stores a direction of a second collimation of the telescope portion oriented from the movement destination position toward the movement source position and a movement distance between the movement source position and the movement destination position. The telescope portion is to be oriented from the movement destination position toward the movement source position by the worker or the like. Specifically, after acquiring first point group data using the scanner unit at the movement source position, the worker or the like moves the three-dimensional survey apparatus to an arbitrary movement destination position and performs collimation of the telescope portion from the movement destination position toward the movement source position. In this manner, the telescope portion is to be oriented from the movement destination position toward the movement source position by the worker or the like. Next, the control calculation portion calculates and stores coordinates of the machine reference point of the collimating ranging unit at the movement destination position with the survey start position as a reference based on the direction of the first collimation, the direction of the second collimation, and the movement distance.

Specifically, the control calculation portion calculates a movement direction of the machine reference point of the collimating ranging unit oriented from the movement source position toward the movement destination position based on a relative angle between the direction of the first collimation from the movement source position toward the movement destination position and the direction of the second collimation from the movement destination position toward the movement source position. Next, the control calculation portion calculates and stores coordinates of the machine reference point of the collimating ranging unit at the movement destination position with the survey start position as a reference based on a movement direction of the machine reference point of the collimating ranging unit and a movement distance between the movement source position and the movement destination position (in other words, a movement distance of the machine reference point of the collimating ranging unit). Next, the control calculation portion stores second point group data acquired at the movement destination position by controlling the scanner unit.

Accordingly, since the control calculation portion stores coordinates of the machine reference point of the collimating ranging unit at a survey start position and coordinates of the machine reference point of the collimating ranging unit at a movement destination position with the survey start position as a reference, for example, another computer to which first point group data and second point group data are input can execute a simplified registration of point group data. By executing a simplified registration of point group data, relative positions of a same location of a measurement object and relative angles of an inclination of the measurement object approximately match each other among a plurality of pieces of point group data acquired at a plurality of mutually different positions. In other words, a deviation between relative positions of a same location of a measurement object and a deviation between relative angles of an inclination of the measurement object among a plurality of pieces of point group data acquired at a plurality of mutually different positions can be suppressed. Therefore, when executing a detailed registration of point group data, a situation where a relatively long processing time is necessary or the detailed registration of the point group data cannot be completed can be suppressed. Accordingly, the three-dimensional survey apparatus according to the present invention can enable registration of point group data to be executed in an efficient manner.

In the three-dimensional survey apparatus according to the present invention, preferably, the collimating ranging unit has an operation inputting portion which transmits information input by an operation to the control calculation portion, and the movement distance is a distance input by a worker in accordance with an operation by the worker with respect to the operation inputting portion.

With the three-dimensional survey apparatus according to the present invention, by performing an operation with respect to the operation inputting portion, the worker or the like can readily input a movement distance between the movement source position and the movement destination position. For example, when the movement destination position is a position that cannot be directly collimated from the movement source position, the worker or the like can input the movement distance between the movement source position and the movement destination position without using a target of measurement such as a prism.

In the three-dimensional survey apparatus according to the present invention, preferably, the control calculation portion has a distance measuring portion which calculates a distance to the measurement object based on reflected ranging light that is the first ranging light having been reflected by the measurement object, and the movement distance is a distance calculated and input by the distance measuring portion.

With the three-dimensional survey apparatus according to the present invention, a movement distance between the movement source position and the movement destination position is automatically input by a calculation of the distance measuring portion. Therefore, by performing collimation of the telescope portion from the movement destination position toward the movement source position, the worker or the like can readily input the movement distance between the movement source position and the movement destination position without having to manually input the movement distance between the movement source position and the movement destination position.

The problem described above is solved by a three-dimensional survey method according to the present invention which is executed by a three-dimensional survey apparatus that includes: a collimating ranging unit which irradiates a measurement object with first ranging light by collimation of a telescope portion to measure a distance to the measurement object and to detect a direction of the collimation; a scanner unit which is integrally provided with the collimating ranging unit and rotatably provided relative to the collimating ranging unit and which acquires point group data with respect to the measurement object by performing rotational irradiation with second ranging light to measure a distance to the measurement object and to detect an irradiation direction of the second ranging light; and a control calculation portion which is provided in at least one of the collimating ranging unit and the scanner unit, the three-dimensional survey apparatus acquiring three-dimensional data of the measurement object, wherein the three-dimensional survey method includes the steps of: storing coordinates of a machine reference point of the collimating ranging unit and a direction of a reference collimation of the telescope portion by a backsight at a survey start position; storing first point group data acquired at a movement source position by controlling the scanner unit; storing a direction of a first collimation of the telescope portion oriented from the movement source position toward a movement destination position; storing a direction of a second collimation of the telescope portion oriented from the movement destination position toward the movement source position and a movement distance between the movement source position and the movement destination position; calculating and storing coordinates of the machine reference point at the movement destination position with the survey start position as a reference based on the direction of the first collimation, the direction of the second collimation, and the movement distance; and storing second point group data acquired at the movement destination position by controlling the scanner unit.

With the three-dimensional survey method according to the present invention, a step of storing coordinates of a machine reference point of the collimating ranging unit and a direction of a reference collimation of the telescope portion of the collimating ranging unit by a backsight at a survey start position is executed. Next, a step of storing first point group data acquired at a movement source position prior to moving the three-dimensional survey apparatus by controlling the scanner unit is executed. Next, a step of storing a direction of a first collimation of the telescope portion oriented from the movement source position toward a movement destination position after moving the three-dimensional survey apparatus is executed. The telescope portion is to be oriented from the movement source position toward the movement destination position by the worker or the like.

In this case, the movement source position refers to a survey position before moving the three-dimensional survey apparatus. Therefore, the movement source position includes a survey start position. In other words, when the worker or the like moves the three-dimensional survey apparatus for the first time after starting a survey at the survey start position, the survey start position corresponds to the movement source position.

Next, a step of storing a direction of a second collimation of the telescope portion oriented from the movement destination position toward the movement source position and a movement distance between the movement source position and the movement destination position is executed. The telescope portion is to be oriented from the movement destination position toward the movement source position by the worker or the like. Specifically, after acquiring first point group data using the scanner unit at the movement source position, the worker or the like moves the three-dimensional survey apparatus to an arbitrary movement destination position and performs collimation of the telescope portion from the movement destination position toward the movement source position. In this manner, the telescope portion is to be oriented from the movement destination position toward the movement source position by the worker or the like. Next, a step of calculating and storing coordinates of the machine reference point of the collimating ranging unit at the movement destination position with the survey start position as a reference based on the direction of the first collimation, the direction of the second collimation, and the movement distance is executed.

Specifically, a movement direction of the machine reference point of the collimating ranging unit oriented from the movement source position toward the movement destination position is calculated based on a relative angle between the direction of the first collimation from the movement source position toward the movement destination position and the direction of the second collimation from the movement destination position toward the movement source position. Next, coordinates of the machine reference point of the collimating ranging unit at the movement destination position with the survey start position as a reference is calculated and stored based on a movement direction of the machine reference point of the collimating ranging unit and a movement distance between the movement source position and the movement destination position (in other words, a movement distance of the machine reference point of the collimating ranging unit). Next, a step of storing second point group data acquired at the movement destination position by controlling the scanner unit is executed.

Accordingly, since a step of storing coordinates of the machine reference point of the collimating ranging unit at a survey start position and coordinates of the machine reference point of the collimating ranging unit at a movement destination position with the survey start position as a reference is executed, for example, another computer to which first point group data and second point group data are input can execute a simplified registration of point group data. By executing a simplified registration of point group data, relative positions of a same location of a measurement object and relative angles of an inclination of the measurement object approximately match each other among a plurality of pieces of point group data acquired at a plurality of mutually different positions. In other words, a deviation between relative positions of a same location of a measurement object and a deviation between relative angles of an inclination of the measurement object among a plurality of pieces of point group data acquired at a plurality of mutually different positions can be suppressed. Therefore, when executing a detailed registration of point group data, a situation where a relatively long processing time is necessary or the detailed registration of the point group data cannot be completed can be suppressed. Accordingly, the three-dimensional survey method according to the present invention can enable registration of point group data to be executed in an efficient manner.

The problem described above is solved by a three-dimensional survey program according to the present invention which is executed by a computer of a three-dimensional survey apparatus that includes: a collimating ranging unit which irradiates a measurement object with first ranging light by collimation of a telescope portion to measure a distance to the measurement object and to detect a direction of the collimation; a scanner unit which is integrally provided with the collimating ranging unit and rotatably provided relative to the collimating ranging unit and which acquires point group data with respect to the measurement object by performing rotational irradiation with second ranging light to measure a distance to the measurement object and to detect an irradiation direction of the second ranging light; and a control calculation portion which is provided in at least one of the collimating ranging unit and the scanner unit, the three-dimensional survey apparatus acquiring three-dimensional data of the measurement object, wherein the three-dimensional survey program causes the computer to execute the steps of: storing coordinates of a machine reference point of the collimating ranging unit and a direction of a reference collimation of the telescope portion by a backsight at a survey start position; storing first point group data acquired at a movement source position by controlling the scanner unit; storing a direction of a first collimation of the telescope portion oriented from the movement source position toward a movement destination position; storing a direction of a second collimation of the telescope portion oriented from the movement destination position toward the movement source position and a movement distance between the movement source position and the movement destination position; calculating and storing coordinates of the machine reference point at the movement destination position with the survey start position as a reference based on the direction of the first collimation, the direction of the second collimation, and the movement distance; and storing second point group data acquired at the movement destination position by controlling the scanner unit.

With the three-dimensional survey program according to the present invention, a step of storing coordinates of a machine reference point of the collimating ranging unit and a direction of a reference collimation of the telescope portion of the collimating ranging unit by a backsight at a survey start position is executed. Next, a step of storing first point group data acquired at a movement source position prior to moving the three-dimensional survey apparatus by controlling the scanner unit is executed. Next, a step of storing a direction of a first collimation of the telescope portion oriented from the movement source position toward a movement destination position after moving the three-dimensional survey apparatus is executed. The telescope portion is to be oriented from the movement source position toward the movement destination position by the worker or the like.

In this case, the movement source position refers to a survey position before moving the three-dimensional survey apparatus. Therefore, the movement source position includes a survey start position. In other words, when the worker or the like moves the three-dimensional survey apparatus for the first time after starting a survey at the survey start position, the survey start position corresponds to the movement source position.

Next, a step of storing a direction of a second collimation of the telescope portion oriented from the movement destination position toward the movement source position and a movement distance between the movement source position and the movement destination position is executed. The telescope portion is to be oriented from the movement destination position toward the movement source position by the worker or the like. Specifically, after acquiring first point group data using the scanner unit at the movement source position, the worker or the like moves the three-dimensional survey apparatus to an arbitrary movement destination position and performs collimation of the telescope portion from the movement destination position toward the movement source position. In this manner, the telescope portion is to be oriented from the movement destination position toward the movement source position by the worker or the like. Next, a step of calculating and storing coordinates of the machine reference point of the collimating ranging unit at the movement destination position with the survey start position as a reference based on the direction of the first collimation, the direction of the second collimation, and the movement distance is executed.

Specifically, a movement direction of the machine reference point of the collimating ranging unit oriented from the movement source position toward the movement destination position is calculated based on a relative angle between the direction of the first collimation from the movement source position toward the movement destination position and the direction of the second collimation from the movement destination position toward the movement source position. Next, coordinates of the machine reference point of the collimating ranging unit at the movement destination position with the survey start position as a reference is calculated and stored based on a movement direction of the machine reference point of the collimating ranging unit and a movement distance between the movement source position and the movement destination position (in other words, a movement distance of the machine reference point of the collimating ranging unit). Next, a step of storing second point group data acquired at the movement destination position by controlling the scanner unit is executed.

Accordingly, since a step of storing coordinates of the machine reference point of the collimating ranging unit at a survey start position and coordinates of the machine reference point of the collimating ranging unit at a movement destination position with the survey start position as a reference is executed, for example, another computer to which first point group data and second point group data are input and which differs from a computer of the three-dimensional survey apparatus can execute a simplified registration of point group data. By executing a simplified registration of point group data, relative positions of a same location of a measurement object and relative angles of an inclination of the measurement object approximately match each other among a plurality of pieces of point group data acquired at a plurality of mutually different positions. In other words, a deviation between relative positions of a same location of a measurement object and a deviation between relative angles of an inclination of the measurement object among a plurality of pieces of point group data acquired at a plurality of mutually different positions can be suppressed. Therefore, when executing a detailed registration of point group data, a situation where a relatively long processing time is necessary or the detailed registration of the point group data cannot be completed can be suppressed. Accordingly, the three-dimensional survey program according to the present invention can enable registration of point group data to be executed in an efficient manner.

According to the present invention, a three-dimensional survey apparatus, a three-dimensional survey method, and a three-dimensional survey program which enable registration of point group data to be executed in an efficient manner can be provided.

DETAILED DESCRIPTION

Figure 1:
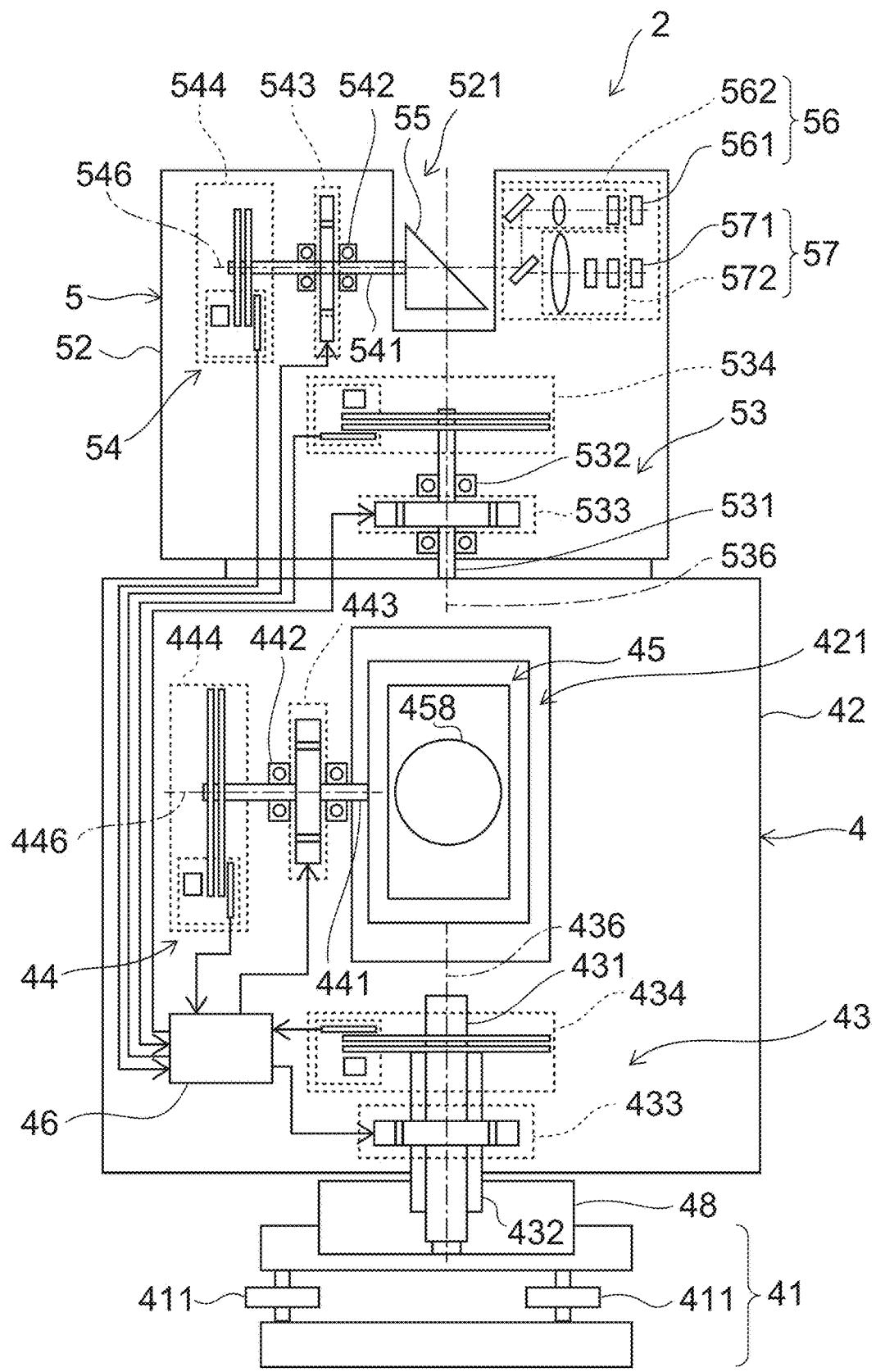
FIG. 1 is a block diagram which mainly shows a structural system of a three-dimensional survey apparatus according to an embodiment of the present invention.

Hereinafter, a preferred embodiment of the present invention will be described in detail with reference to the drawings. Although the embodiment described hereinafter is a preferred specific example of the present invention and therefore involves various favorable technical limitations, it is to be understood that the scope of the present invention is by no means limited by the embodiment unless specifically noted otherwise hereinafter. It should also be noted that, in the drawings, similar components will be denoted by same reference signs and detailed descriptions thereof will be omitted when appropriate.

FIG. 1 is a block diagram which mainly shows a structural system of a three-dimensional survey apparatus according to an embodiment of the present invention.

Figure 2:
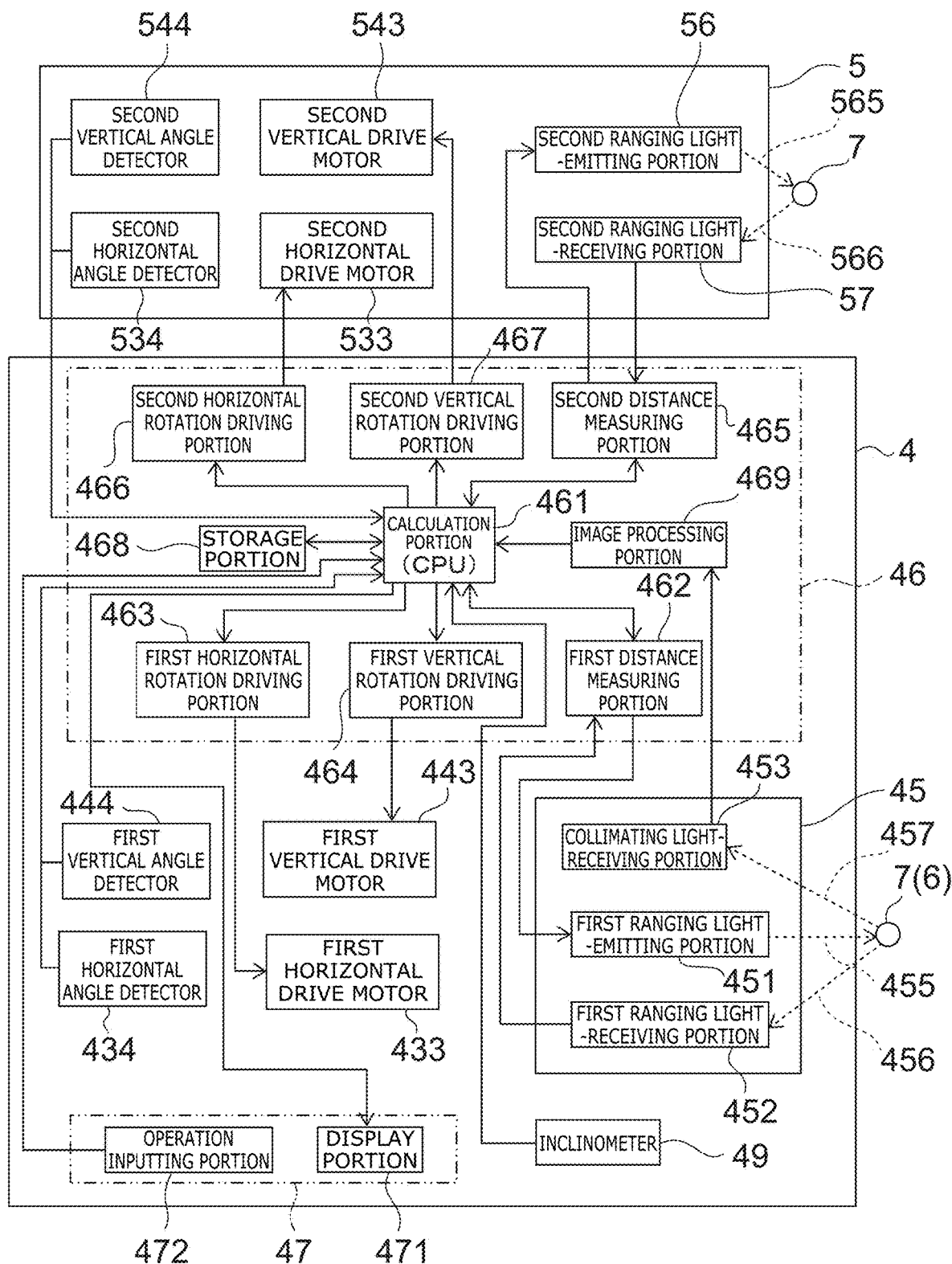
FIG. 2 is a block diagram which mainly shows a control system of the three-dimensional survey apparatus according to the present embodiment.

FIG. 2 is a block diagram which mainly shows a control system of the three-dimensional survey apparatus according to the present embodiment.

A three-dimensional survey apparatus 2 according to the present embodiment includes a collimating ranging unit 4 and a scanner unit 5 and acquires three-dimensional data of a measurement object 7 such as an architectural structure. The collimating ranging unit 4 is referred to as a total station or the like and, due to collimation of a telescope portion 45, irradiates the measurement object 7 with first ranging light 455 (refer to FIG. 2), measures a distance to the measurement object 7 based on first reflected ranging light 456 (refer to FIG. 2) that is the first ranging light 455 having been reflected by the measurement object 7 and first internal reference light (not illustrated), and detects an irradiation direction of the first ranging light 455 or, in other words, a direction of collimation of the telescope portion 45. In other words, the collimating ranging unit 4 is a device that performs ranging and angle measurement. Details of the collimating ranging unit 4 will be provided later.

Measurement objects of which the collimating ranging unit 4 performs ranging and angle measurement include a target of measurement 6 such as a prism. In other words, the collimating ranging unit 4 is capable of performing ranging and angle measurement with respect to the target of measurement 6 such as a prism as a measurement object. The prism to be used as the target of measurement 6 is not particularly limited and may be a circular prism, a spherical prism, or a planar prism.

The scanner unit 5 is integrally provided with the collimating ranging unit 4 and is rotatably provided relative to the collimating ranging unit 4. The scanner unit 5 irradiates the measurement object 7 with second ranging light 565 (refer to FIG. 2), measures a distance to the measurement object 7 based on second reflected ranging light 566 (refer to FIG. 2) that is the second ranging light 565 having been reflected by the measurement object 7 and second internal reference light (not illustrated), and detects an irradiation direction of the second ranging light 565. The scanner unit 5 is a device that performs ranging and angle measurement in a similar manner to the collimating ranging unit 4.

More specifically, the scanner unit 5 acquires three-dimensional coordinates (three-dimensional data) of a large number of measurement points with respect to the measurement object 7 by performing rotational irradiation with the second ranging light 565 to measure the distance to the measurement object 7 and to detect the irradiation direction of the second ranging light 565. In other words, the scanner unit 5 acquires three-dimensional data (point group data) of a large number of measurement points of the measurement object 7. Details of the scanner unit 5 will be provided later.

The collimating ranging unit 4 according to the present embodiment has a leveling portion 41, a first mount portion 42, a first horizontal rotation portion 43, a first vertical rotation portion 44, the telescope portion 45, a control calculation portion 46, an operation display portion 47, a base portion 48, and an inclinometer 49. The collimating ranging unit 4 need not necessarily include the inclinometer 49. The collimating ranging unit 4 may have an automatic tracking function that automatically searches for the target of measurement 6 as a measurement object.

The control calculation portion 46 has a calculation portion 461, a first distance measuring portion 462, a first horizontal rotation driving portion 463, a first vertical rotation driving portion 464, a second distance measuring portion 465, a second horizontal rotation driving portion 466, a second vertical rotation driving portion 467, a storage portion 468, and an image processing portion 469. The calculation portion 461 is a central processing unit (CPU) or the like and, based on a signal (command) transmitted from an operation inputting portion 472 of the operation display portion 47, executes activation of a program, control processing of the signal, calculations, drive control of a display portion 471 of the operation display portion 47, and the like. In other words, the calculation portion 461 performs control of the entire three-dimensional survey apparatus 2 and causes the display portion 471 to display survey conditions, measurement results (ranging results and angle measurement results), image processing results (images of collimation ranges), and the like.

Alternatively, the control calculation portion 46 may be provided in the scanner unit 5 or may be provided in both the collimating ranging unit 4 and the scanner unit 5. In other words, the control calculation portion 46 is provided in at least one of the collimating ranging unit 4 and the scanner unit 5.

The first distance measuring portion 462, the first horizontal rotation driving portion 463, the first vertical rotation driving portion 464, the second distance measuring portion 465, the second horizontal rotation driving portion 466, the second vertical rotation driving portion 467, and the image processing portion 469 are realized as the calculation portion 461 executes a program stored in the storage portion 468. Alternatively, the first distance measuring portion 462, the first horizontal rotation driving portion 463, the first vertical rotation driving portion 464, the second distance measuring portion 465, the second horizontal rotation driving portion 466, the second vertical rotation driving portion 467, and the image processing portion 469 may be realized by hardware or may be realized by a combination of hardware and software.

For example, the storage portion 468 stores a sequence program for measurement, an image processing program for image processing, a calculation program, or the like. Examples of the storage portion 468 include a semiconductor memory built into the three-dimensional survey apparatus 2 or the like. Other examples of the storage portion 468 include various storage media connectable to the three-dimensional survey apparatus 2 such as a compact disc (CD), a digital versatile disc (DVD), a random access memory (RAM), and a read only memory (ROM).

A program that is executed by a computer including the control calculation portion 46 corresponds to the "three-dimensional survey program" according to the present invention. A "computer" as used herein is not limited to a personal computer and collectively refers to devices and apparatuses capable of realizing functions of the present invention including arithmetic processing units and microcomputers included in information processing devices.

The leveling portion 41 is a portion to be attached to a tripod (not illustrated) and has, for example, three adjustment screws 411. Leveling of the leveling portion 41 is performed by adjusting, at a survey position, the adjustment screws 411 so that an inclination sensor (not illustrated) provided on the first mount portion 42 detects level. In other words, the first mount portion 42 is kept level by leveling using the adjustment screws 411 at a survey position.

The first horizontal rotation portion 43 has a first horizontal rotary shaft 431, a bearing 432, a first horizontal drive motor 433, and a first horizontal angle detector (for example, an encoder) 434. The first horizontal rotary shaft 431 has a vertically-extending first vertical axial center 436 and is rotatably supported by the base portion 48 via the bearing 432. The first mount portion 42 is supported by the first horizontal rotary shaft 431 and integrally rotates with the first horizontal rotary shaft 431 in a horizontal direction around the first vertical axial center 436 due to a drive force transmitted from the first horizontal drive motor 433.

A rotational angle of the first horizontal rotary shaft 431 relative to the base portion 48 (in other words, a rotational angle of the first mount portion 42) is detected by the first horizontal angle detector 434. A detection result of the first horizontal angle detector 434 is input to the calculation portion 461. Drive of the first horizontal drive motor 433 is controlled by the first horizontal rotation driving portion 463 based on the detection result of the first horizontal angle detector 434.

The first vertical rotation portion 44 has a first vertical rotary shaft 441, a bearing 442, a first vertical drive motor 443, and a first vertical angle detector (for example, an encoder) 444. The first vertical rotary shaft 441 has a horizontally-extending first horizontal axial center 446 and is rotatably supported by the first mount portion 42 via the bearing 442. One end of the first vertical rotary shaft 441 protrudes into a gap portion 421 of the first mount portion 42. The telescope portion 45 is supported by the one end of the first vertical rotary shaft 441 that protrudes into the gap portion 421 of the first mount portion 42, and integrally rotates with the first vertical rotary shaft 441 in a vertical direction around the first horizontal axial center 446 due to a drive force transmitted from the first vertical drive motor 443.

The first vertical angle detector 444 is provided at another end of the first vertical rotary shaft 441. A rotational angle of the first vertical rotary shaft 441 relative to the first mount portion 42 (in other words, a rotational angle of the telescope portion 45) is detected by the first vertical angle detector 444. A detection result of the first vertical angle detector 444 is input to the calculation portion 461. Drive of the first vertical drive motor 443 is controlled by the first vertical rotation driving portion 464 based on the detection result of the first vertical angle detector 444.

As described earlier, the telescope portion 45 is supported by the first vertical rotary shaft 441 and rotates in a vertical direction around the first horizontal axial center 446 due to a drive force transmitted from the first vertical drive motor 443. The telescope portion 45 has a collimating telescope 458, and is collimated to the measurement object 7 including the target of measurement 6 and irradiates the measurement object 7 with the first ranging light 455. The first ranging light 455 is emitted onto a ranging optical axis of the telescope portion 45. The ranging optical axis of the telescope portion 45 intersects with the first vertical axial center 436 and is perpendicular to the first horizontal axial center 446. An intersection point of the ranging optical axis of the telescope portion 45 and the first vertical axial center 436 may be set to a machine reference point of the collimating ranging unit 4. In the description of the present embodiment, a case where the machine reference point of the collimating ranging unit 4 is an intersection point of the ranging optical axis of the telescope portion 45 and the first vertical axial center 436 will be cited as an example.

The telescope portion 45 has a first ranging light-emitting portion 451, a first ranging light-receiving portion 452, and a collimating light-receiving portion 453.

The first ranging light-emitting portion 451 is driven and controlled by the first distance measuring portion 462. The first ranging light-emitting portion 451 is provided inside the telescope portion 45 and, for example, emits the first ranging light 455 that is a laser beam or the like in a direction perpendicular to the first horizontal axial center 446. The first ranging light 455 emitted from the first ranging light-emitting portion 451 irradiates the measurement object 7. As described earlier, the measurement object of which the collimating ranging unit 4 performs ranging and angle measurement is not limited to the measurement object 7 such as an architectural structure and may be the target of measurement 6 such as a prism. The first reflected ranging light 456 that is reflected by the measurement object 7 is received by the first ranging light-receiving portion 452 provided inside the telescope portion 45. The first ranging light-receiving portion 452 converts brightness and darkness (a light reception result) of the received first reflected ranging light 456 into an electronic signal (a light reception signal) and transmits the light reception signal to the first distance measuring portion 462. In addition, the first ranging light-receiving portion 452 receives internal reference light (not illustrated) guided from a reference light optical portion (not illustrated), converts the internal reference light into an electric signal, and transmits the electrical signal to the first distance measuring portion 462.

The first distance measuring portion 462 calculates the distance to the measurement object 7 based on the light reception signal transmitted from the first ranging light-receiving portion 452. In other words, the first reflected ranging light 456 and the internal reference light are respectively converted into a first reflected ranging light electrical signal and an internal reference light electrical signal and then sent to the first distance measuring portion 462. The distance to the measurement object 7 is measured based on a difference in time intervals between the first reflected ranging light electrical signal and the internal reference light electrical signal. A calculation result of the first distance measuring portion 462 is input to the calculation portion (CPU) 461.

The calculation portion 461 calculates coordinates of the measurement object 7 based on the measured distance to the measurement object 7, a vertical angle detected by the first vertical angle detector 444, and a horizontal angle detected by the first horizontal angle detector 434. Alternatively, the calculation portion 461 may calculate coordinates of the machine reference point of the collimating ranging unit 4 with a prescribed position (for example, a survey start position to be described later) as a reference based on the measured distance to the measurement object 7, the vertical angle detected by the first vertical angle detector 444, and the horizontal angle detected by the first horizontal angle detector 434.

The collimating light-receiving portion 453 is an image sensor such as a charge coupled device (CCD) or a complementary metal oxide semiconductor (CMOS) and receives reflected collimating light 457 with a wavelength region that differs from a wavelength region of the first reflected ranging light 456. The reflected collimating light 457 is light which has a wavelength region that differs from a wavelength region of the first reflected ranging light 456 and which is reflected by the measurement object 7. In other words, the collimating light-receiving portion 453 receives the reflected collimating light 457 that is reflected by the measurement object 7 and optically receives an image of the measurement object 7. Examples of the reflected collimating light 457 include natural light and infrared light. However, the reflected collimating light 457 is not limited thereto. The reflected collimating light 457 is received by the collimating light-receiving portion 453 provided inside the telescope portion 45. The collimating light-receiving portion 453 converts brightness and darkness (a light reception result) of the reflected collimating light 457 into an electronic signal (an image signal) and transmits the image signal to the image processing portion 469.

The image processing portion 469 executes image processing of the image signal transmitted from the collimating light-receiving portion 453 and transmits the processed image signal to the calculation portion 461 as an image data signal. The calculation portion 461 executes a calculation based on the image data signal transmitted from the image processing portion 469 and executes control to cause the display portion 471 of the operation display portion 47 to display an image of a collimation range of the telescope portion 45.

The inclinometer 49 measures an inclination (an inclination angle) of the collimating ranging unit 4 relative to gravity. A measurement result of the inclinometer 49 is input to the calculation portion 461.

The scanner unit 5 according to the present embodiment has a second mount portion 52, a second horizontal rotation portion 53, a second vertical rotation portion 54, a scanning mirror 55, a second ranging light-emitting portion 56, and a second ranging light-receiving portion 57.

The second horizontal rotation portion 53 has a second horizontal rotary shaft 531, a bearing 532, a second horizontal drive motor 533, and a second horizontal angle detector (for example, an encoder) 534. The second horizontal rotary shaft 531 has a vertically-extending second vertical axial center 536 and is rotatably supported by the second mount portion 52 via the bearing 532. One end of the second horizontal rotary shaft 531 is connected to the first mount portion 42 of the collimating ranging unit 4. The second mount portion 52 is supported by the second horizontal rotary shaft 531 and integrally rotates with the second horizontal rotary shaft 531 in a horizontal direction around the second vertical axial center 536 due to a drive force transmitted from the second horizontal drive motor 533.

The second vertical axial center 536 is parallel to the first vertical axial center 436. In the three-dimensional survey apparatus 2 according to the present embodiment, the first vertical axial center 436 and the second vertical axial center 536 are present on a same straight line. However, the first vertical axial center 436 and the second vertical axial center 536 are not limited to being present on a same straight line. A distance between the first vertical axial center 436 and the second vertical axial center 536 is known. In other words, a position of the second vertical axial center 536 relative to the first vertical axial center 436 is known.

The second horizontal angle detector 534 is provided at another end of the second horizontal rotary shaft 531. A rotational angle of the second horizontal rotary shaft 531 relative to the first mount portion 42 (in other words, a rotational angle of the second mount portion 52) is detected by the second horizontal angle detector 534. A detection result of the second horizontal angle detector 534 is input to the calculation portion 461. Drive of the second horizontal drive motor 533 is controlled by the second horizontal rotation driving portion 466 based on the detection result of the second horizontal angle detector 534.

The second vertical rotation portion 54 has a second vertical rotary shaft 541, a bearing 542, a second vertical drive motor 543, and a second vertical angle detector (for example, an encoder) 544. The second vertical rotary shaft 541 has a horizontally-extending second horizontal axial center 546 and is rotatably supported by the second mount portion 52 via the bearing 542. One end of the second vertical rotary shaft 541 protrudes into a recessed portion 521 of the second mount portion 52. The scanning mirror 55 is supported by the one end of the second vertical rotary shaft 541 that protrudes into the recessed portion 521 of the second mount portion 52, and integrally rotates with the second vertical rotary shaft 541 in a vertical direction around the second horizontal axial center 546 due to a drive force transmitted from the second vertical drive motor 543.

The second vertical angle detector 544 is provided at another end of the second vertical rotary shaft 541. A rotational angle of the second vertical rotary shaft 541 relative to the second mount portion 52 (in other words, a rotational angle of the scanning mirror 55) is detected by the second vertical angle detector 544. A detection result of the second vertical angle detector 544 is input to the calculation portion 461. Drive of the second vertical drive motor 543 is controlled by the second vertical rotation driving portion 467 based on the detection result of the second vertical angle detector 544.

The second horizontal axial center 546 is parallel to the first horizontal axial center 446. A distance between the first horizontal axial center 446 and the second horizontal axial center 546 is known. In other words, a position of the second horizontal axial center 546 relative to the first horizontal axial center 446 is known.

The scanning mirror 55 is a deflecting optical member and reflects, at a right angle, the second ranging light 565 incident from a horizontal direction. In other words, the scanning mirror 55 reflects, in a direction perpendicular to the second horizontal axial center 546, the second ranging light 565 incident from a horizontal direction. As described earlier, the scanning mirror 55 is supported by the second vertical rotary shaft 541 and rotates in a vertical direction around the second horizontal axial center 546 due to a drive force transmitted from the second vertical drive motor 543. Accordingly, the scanning mirror 55 causes rotational irradiation with the second ranging light 565 to be performed within a plane that intersects with (specifically, perpendicular to) the second horizontal axial center 546. In addition, the scanning mirror 55 reflects, toward the second ranging light-receiving portion 57, the second reflected ranging light 566 reflected by the measurement object 7 and incident to the scanning mirror 55. In other words, the scanning mirror 55 reflects, in a direction parallel to the second horizontal axial center 546, the second reflected ranging light 566 reflected by the measurement object 7 and incident to the scanning mirror 55.

An intersection point of the second horizontal axial center 546 and the scanning mirror 55 is set to a machine reference point of the scanner unit 5. For example, the machine reference point of the collimating ranging unit 4 and the machine reference point of the scanner unit 5 are present on the first vertical axial center 436 and the second vertical axial center 536 which are present on a same straight line. A distance between the machine reference point of the collimating ranging unit 4 and the machine reference point of the scanner unit 5 is known.

As shown in FIG. 2, the second ranging light-emitting portion 56 has a light-emitting element 561 and a light-emitting optical portion 562 including an objective lens or the like and is driven and controlled by the second distance measuring portion 465. The light-emitting element 561 is, for example, a semiconductor laser and emits the second ranging light 565 via the light-emitting optical portion 562 onto an optical axis that matches the second horizontal axial center 546. The second ranging light 565 is a pulse laser beam of infrared light as invisible light. The light-emitting element 561 is controlled by the second distance measuring portion 465 and emits pulse light in a required state including a required light intensity and a required pulse interval.

As shown in FIG. 2, the second ranging light-receiving portion 57 has a light-receiving element 571 and a light-receiving optical portion 572 including a condenser lens or the like. The light-receiving element 571 receives the second reflected ranging light 566 which is the second ranging light 565 having been reflected by the measurement object 7, having been reflected by the scanning mirror 55, and having passed through the light-receiving optical portion 572. The light-receiving element 571 converts brightness and darkness (a light reception result) of the received second reflected ranging light 566 into an electronic signal (a light reception signal) and transmits the light reception signal to the second distance measuring portion 465. In addition, the light-receiving element 571 receives internal reference light (not illustrated) guided from the reference light optical portion (not illustrated), converts the internal reference light into an electric signal, and transmits the electrical signal to the second distance measuring portion 465.

The second distance measuring portion 465 calculates the distance to the measurement object 7 based on the light reception signal transmitted from the second ranging light-receiving portion 57 (specifically, the light-receiving element 571). In other words, the second reflected ranging light 566 and the internal reference light are respectively converted into a second reflected ranging light electrical signal and an internal reference light electrical signal and then sent to the second distance measuring portion 465. The distance to the measurement object 7 is measured based on a difference in time intervals between the second reflected ranging light electrical signal and the internal reference light electrical signal. A calculation result of the second distance measuring portion 465 is input to the calculation portion 461.

The calculation portion 461 calculates coordinates of the measurement object 7 based on the measured distance to the measurement object 7, a vertical angle detected by the second vertical angle detector 544, and a horizontal angle detected by the second horizontal angle detector 534. In addition, by recording coordinates of the measurement object 7 for each pulse light beam, the calculation portion 461 can obtain point group data with respect to an entire measurement range or point group data with respect to the measurement object 7.

Next, an outline of operations of the three-dimensional survey apparatus according to the present embodiment will be described with reference to the drawings.

Figure 3:
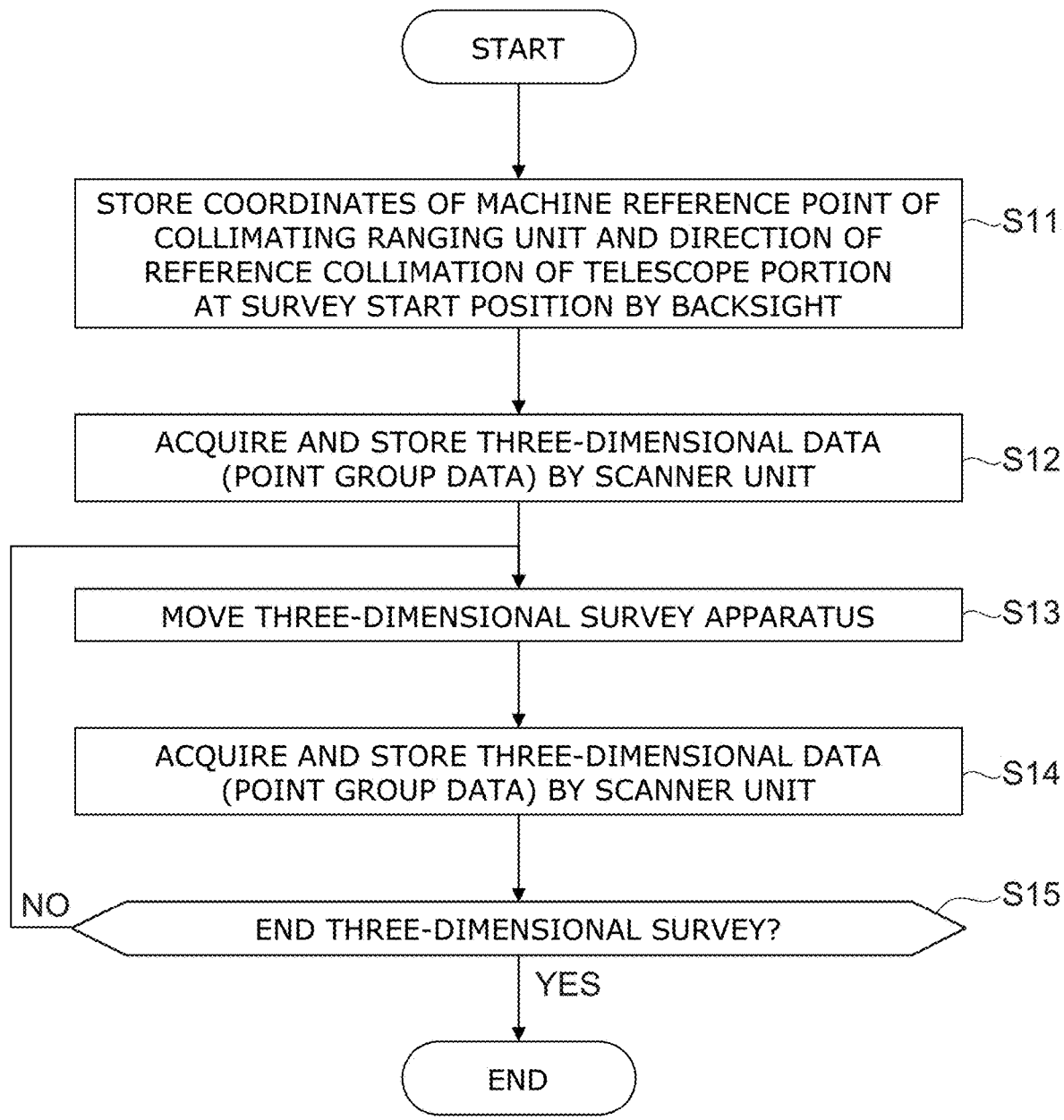
FIG. 3 is a flow chart which shows an outline of operations of the three-dimensional survey apparatus according to the present embodiment.

FIG. 3 is a flow chart which shows an outline of operations of the three-dimensional survey apparatus according to the present embodiment.

Figure 4:
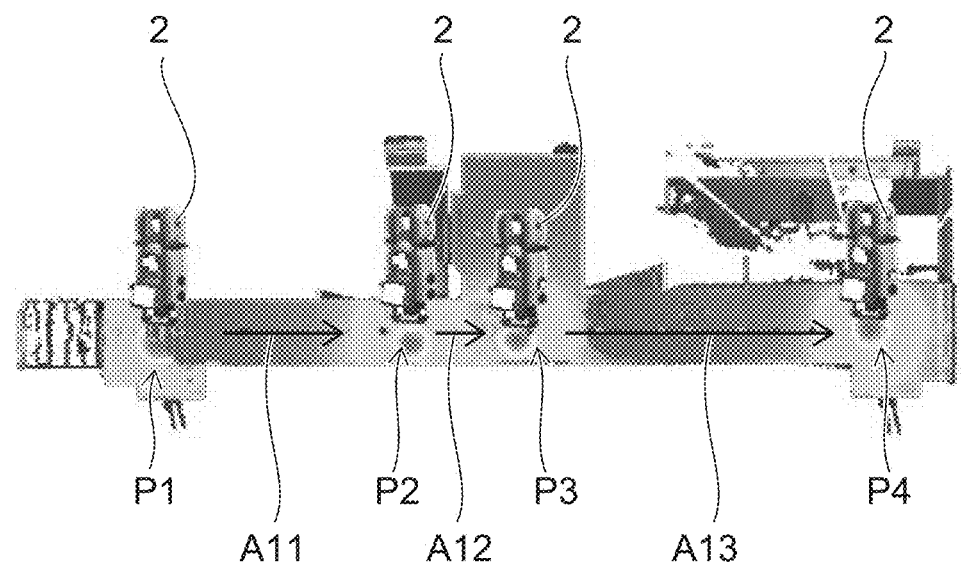
FIG. 4 is a schematic view illustrating circumstances in which the three-dimensional survey apparatus according to the present embodiment acquires three-dimensional data of a measurement object at a plurality of positions.

FIG. 4 is a schematic view illustrating circumstances in which the three-dimensional survey apparatus according to the present embodiment acquires three-dimensional data of a measurement object at a plurality of positions.

FIGS. 5A to 5D are schematic views illustrating three-dimensional data of a measurement object acquired at each of a plurality of positions.

Figure 6:
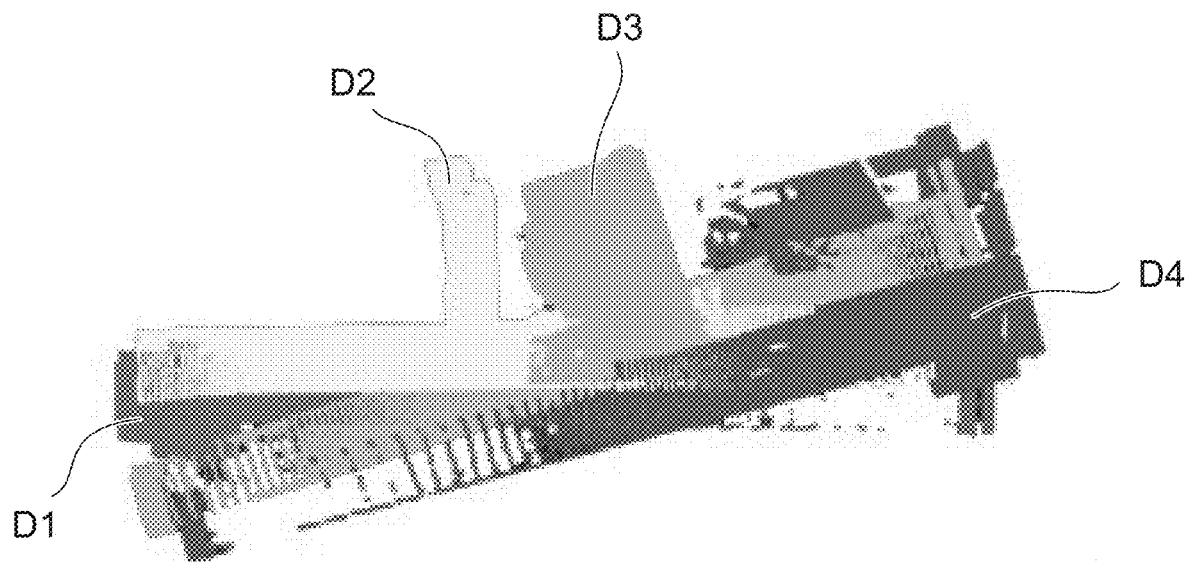
FIG. 6 is a schematic view illustrating a state where a simplified registration of point group data is executed.

FIG. 6 is a schematic view illustrating a state where a simplified registration of point group data is executed.

Figure 7:
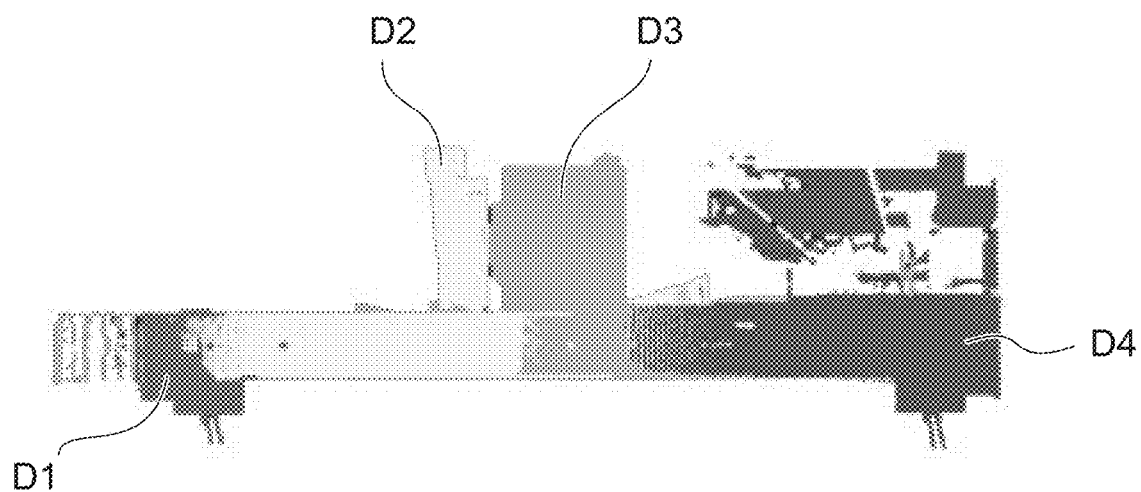
FIG. 7 is a schematic view illustrating a state where a detailed registration of point group data is executed.

FIG. 7 is a schematic view illustrating a state where a detailed registration of point group data is executed.

FIG. 3 is, in other words, a flow chart showing an outline of steps executed by the three-dimensional survey method according to the present embodiment and steps which the three-dimensional survey program according to the present embodiment causes a computer of the three-dimensional survey apparatus 2 to execute.

When the measurement object 7 is relatively large as in the case of an architectural structure, the three-dimensional survey apparatus 2 cannot acquire three-dimensional data of the entire measurement object 7 from one position. For example, the three-dimensional survey apparatus 2 is incapable of acquiring three-dimensional data of a wall surface on a rear side of an architectural structure which cannot be collimated from a position (a survey position) where the three-dimensional survey apparatus 2 is installed. Therefore, in such a case, the worker or the like moves the three-dimensional survey apparatus 2 and acquires three-dimensional data of the entire measurement object 7 by acquiring three-dimensional data of the measurement object 7 from each of a plurality of mutually different positions.

As depicted by arrows A11, A12, and A13, FIG. 4 shows an example in which, after starting acquisition of three-dimensional data of the measurement object 7 at a survey start position (a first survey position) P1, the three-dimensional survey apparatus 2 is moved to a second survey position P2, a third survey position P3, and a fourth survey position P4 in this order to acquire three-dimensional data of the measurement object 7 at the respective survey positions P2, P3, and P4.

As shown in FIG. 3, first, in step S11, the control calculation portion 46 of the three-dimensional survey apparatus 2 stores, in the storage portion 468, coordinates of a machine reference point of the collimating ranging unit 4 and a direction of a reference collimation of the telescope portion 45 of the collimating ranging unit 4 at the survey start position P1 by a backsight using a backward intersection method or the like. Specifically, based on a distance from the collimating ranging unit 4 to the target of measurement 6 such as a prism, a vertical angle detected by the first vertical angle detector 444, and a horizontal angle detected by the first horizontal angle detector 434, the control calculation portion 46 calculates coordinates of a machine reference point of the collimating ranging unit 4 and a direction of a reference collimation of the telescope portion 45 of the collimating ranging unit 4 and stores the coordinates and the reference collimation in the storage portion 468. Note that, in step S11, the target of measurement 6 need not necessarily be used.

Figure 5A:
FIGS. 5A to 5D are schematic views illustrating three-dimensional data of a measurement object acquired at each of a plurality of positions.
Figure 5B:
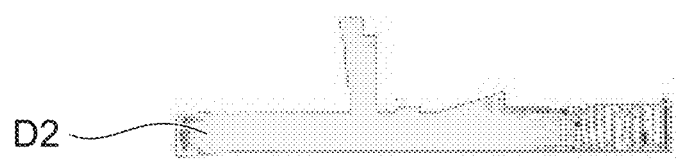

Next, in step S12, the control calculation portion 46 stores, in the storage portion 468, the three-dimensional data (point group data) acquired at the survey start position P1. An example of three-dimensional data D1 acquired at the survey start position P1 and stored in the storage portion 468 is as shown in FIG. 5A. Next, in step S13, the worker or the like moves the three-dimensional survey apparatus 2 from the survey start position P1 to the second survey position P2. The second survey position P2 is a position which is arbitrarily determined by the worker or the like and may be a position that can be directly collimated as viewed from the survey start position P1 or a position that cannot be directly collimated as viewed from the survey start position P1. Next, in step S14, the control calculation portion 46 stores the three-dimensional data (point group data) acquired at the second survey position P2. An example of three-dimensional data D2 acquired at the second survey position P2 and stored in the storage portion 468 is as shown in FIG. 5B.

Figure 5C:
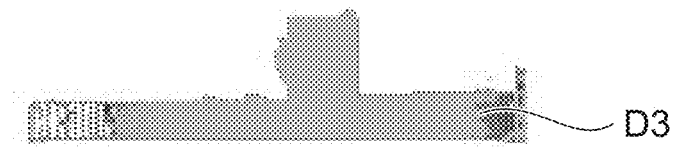

Next, when the three-dimensional survey by the three-dimensional survey apparatus 2 is not to be ended (step S15: NO), the control calculation portion 46 repetitively executes the processing described above with respect to step S13 and step S14. Specifically, in the example shown in FIG. 4, in step S13 following step S15, the worker or the like moves the three-dimensional survey apparatus 2 from the second survey position P2 to the third survey position P3. Next, in step S14, the control calculation portion 46 stores the three-dimensional data (point group data) acquired at the third survey position P3. An example of three-dimensional data D3 acquired at the third survey position P3 and stored in the storage portion 468 is as shown in FIG. 5C.

Figure 5D:
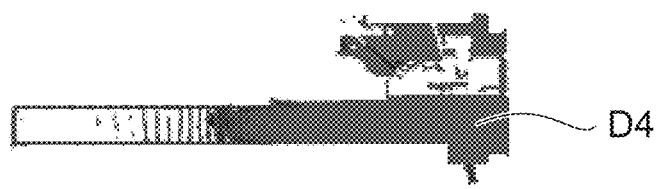

Furthermore, in step S13 following step S15, the worker or the like moves the three-dimensional survey apparatus 2 from the third survey position P3 to the fourth survey position P4. Next, in step S14, the control calculation portion 46 stores the three-dimensional data (point group data) acquired at the fourth survey position P4. An example of three-dimensional data D4 acquired at the fourth survey position P4 and stored in the storage portion 468 is as shown in FIG. 5D.

Next, when the three-dimensional survey by the three-dimensional survey apparatus 2 is to be ended (step S15: YES), the control calculation portion 46 ends the three-dimensional survey by the three-dimensional survey apparatus 2.

As shown in FIG. 6, when the pieces of three-dimensional data D1, D2, D3, and D4 are input to, for example, another computer (for example, a personal computer) which differs from the three-dimensional survey apparatus 2, the other computer automatically executes a simplified registration of the point group data.

At this point, when a deviation between relative positions of a same location of the measurement object 7 is large and when a deviation between relative angles of an inclination of the measurement object 7 is large among the pieces of three-dimensional data D1, D2, D3, and D4, the registration of the point group data may require a relatively long processing time or the registration of the point group data may be incompletable. In addition, in order to reduce processing time of the registration of the point group data or to more reliably complete the registration of the point group data, relative positions of a same location of the measurement object 7 and relative angles of an inclination of the measurement object 7 among the pieces of three-dimensional data D1, D2, D3, and D4 may be manually aligned to a certain degree. As described above, when a deviation between relative positions of a same location of the measurement object 7 is large and when a deviation between relative angles of an inclination of the measurement object 7 is large among pieces of three-dimensional data D1, D2, D3, and D4, registration of point group data may be time-consuming or labor-intensive.

In contrast, with the three-dimensional survey apparatus 2 according to the present embodiment, based on operations and processing to be described in detail later, the control calculation portion stores coordinates of a machine reference point of the collimating ranging unit 4 at the survey start position P1 and the coordinates of the machine reference point of the collimating ranging unit 4 at a movement destination position with the survey start position P1 as a reference. In the example shown in FIG. 4, the second survey position P2, the third survey position P3, and the fourth survey position P4 correspond to the "movement destination position". Accordingly, as shown in FIG. 6, when a simplified registration of point group data is executed by, for example, another computer to which the pieces of three-dimensional data D1, D2, D3, and D4 are input, relative positions of a same location of the measurement object 7 and relative angles of an inclination of the measurement object 7 approximately match each other among the plurality of pieces of three-dimensional data (point group data) D1, D2, D3, and D4 acquired at a plurality of mutually different survey positions P1, P2, P3, and P4. In other words, a deviation between relative positions of a same location of the measurement object 7 and a deviation between relative angles of an inclination of the measurement object 7 among the plurality of pieces of three-dimensional data (point group data) D1, D2, D3, and D4 acquired at a plurality of mutually different survey positions P1, P2, P3, and P4 can be suppressed. Therefore, as shown in FIG. 7, when executing a detailed registration of point group data, a situation where a relatively long processing time is necessary or the detailed registration of the point group data cannot be completed can be suppressed. Accordingly, the three-dimensional survey apparatus 2 according to the present embodiment can execute a registration of point group data in an efficient manner.

Note that a simplified registration of point group data and a detailed registration of point group data are not limited to being executed by another computer (for example, a personal computer) that differs from the three-dimensional survey apparatus 2 and may be executed by the control calculation portion 46 of the three-dimensional survey apparatus 2. In the description of the present embodiment, a case where a simplified registration of point group data and a detailed registration of point group data are executed by another computer (for example, a personal computer) that differs from the three-dimensional survey apparatus 2 will be cited as an example. In addition, various known techniques such as an interactive closest point (ICP) algorithm and methods that are extensions of an ICP algorithm can be utilized as the detailed registration of point group data.

Next, details of operations of the three-dimensional survey apparatus according to the present embodiment will be described with reference to the drawings.

Figure 8:
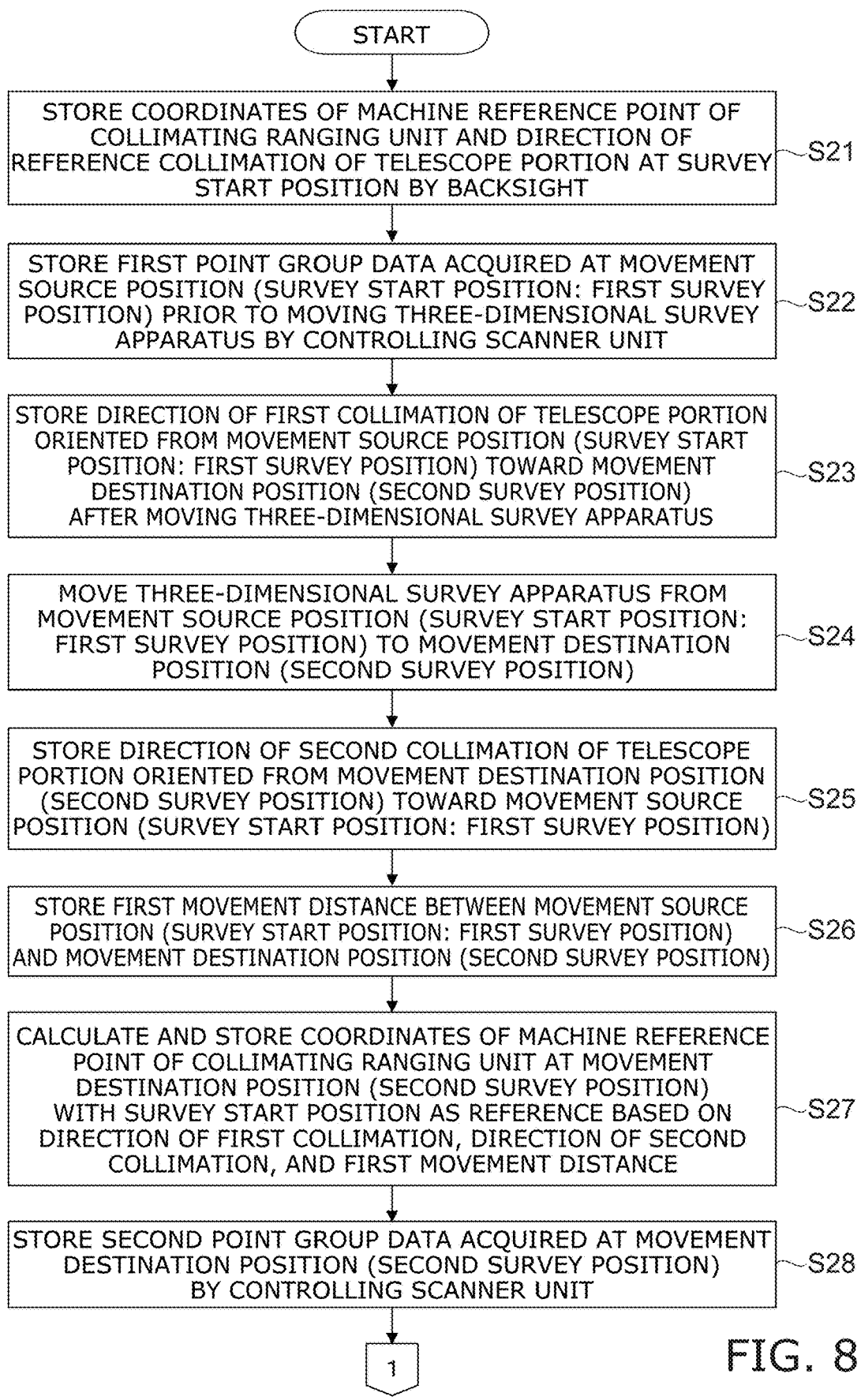
FIG. 8 is a flow chart which shows details of operations of the three-dimensional survey apparatus according to the present embodiment.
Figure 9:
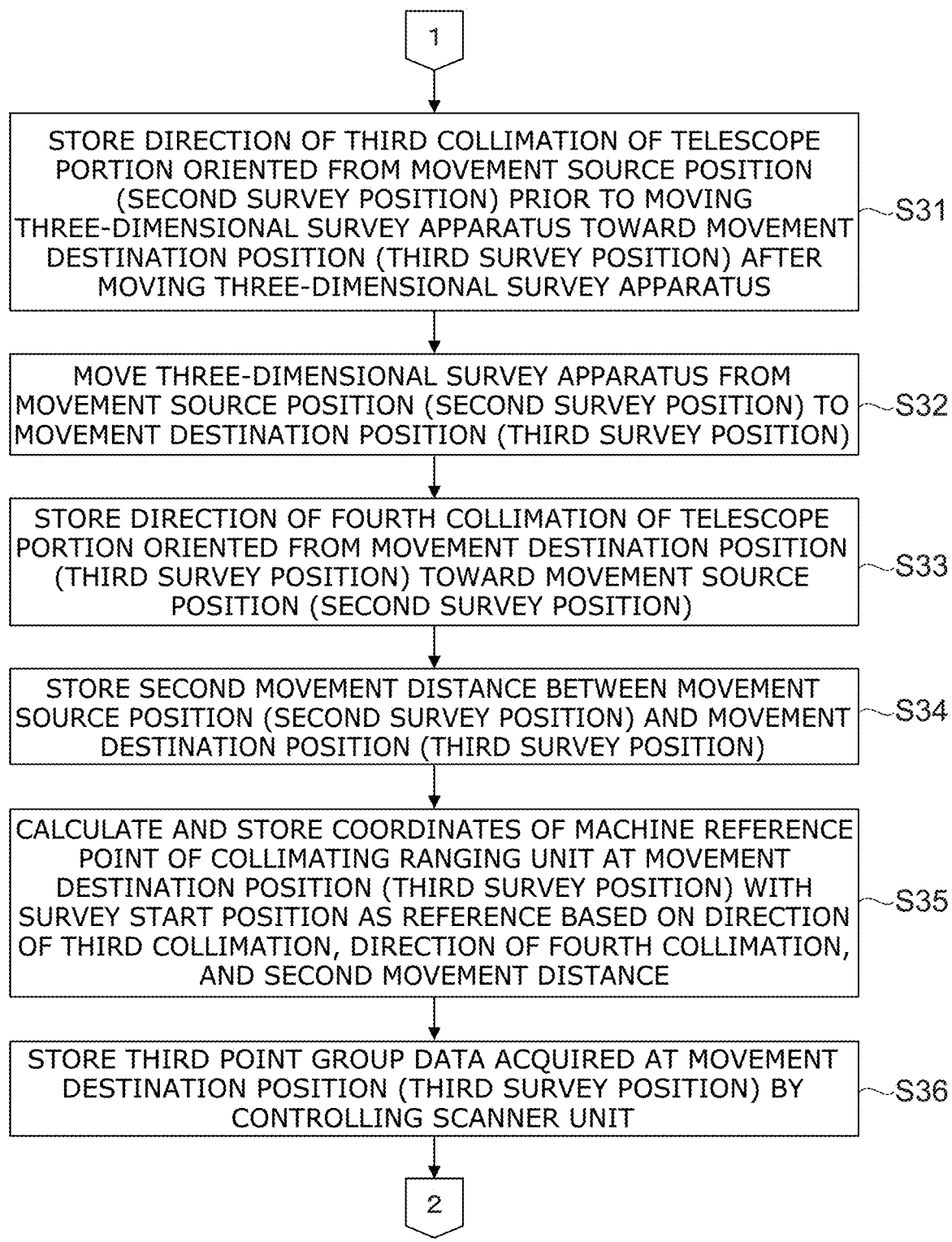
FIG. 9 is a flow chart which shows details of operations of the three-dimensional survey apparatus according to the present embodiment.
Figure 10:
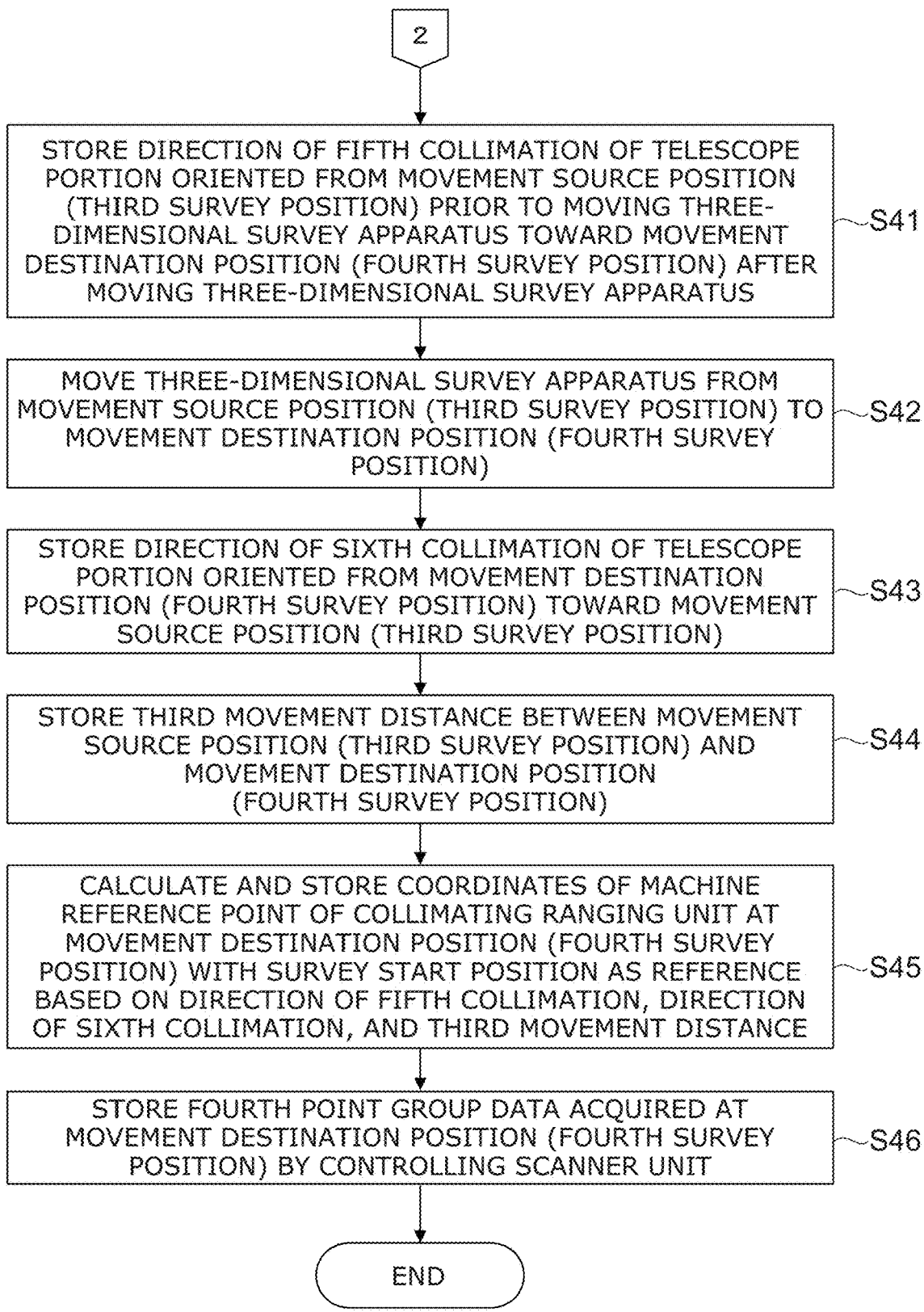
FIG. 10 is a flow chart which shows details of operations of the three-dimensional survey apparatus according to the present embodiment.

FIGS. 8 to 10 are flow charts which show details of operations of the three-dimensional survey apparatus according to the present embodiment.

Figure 11:
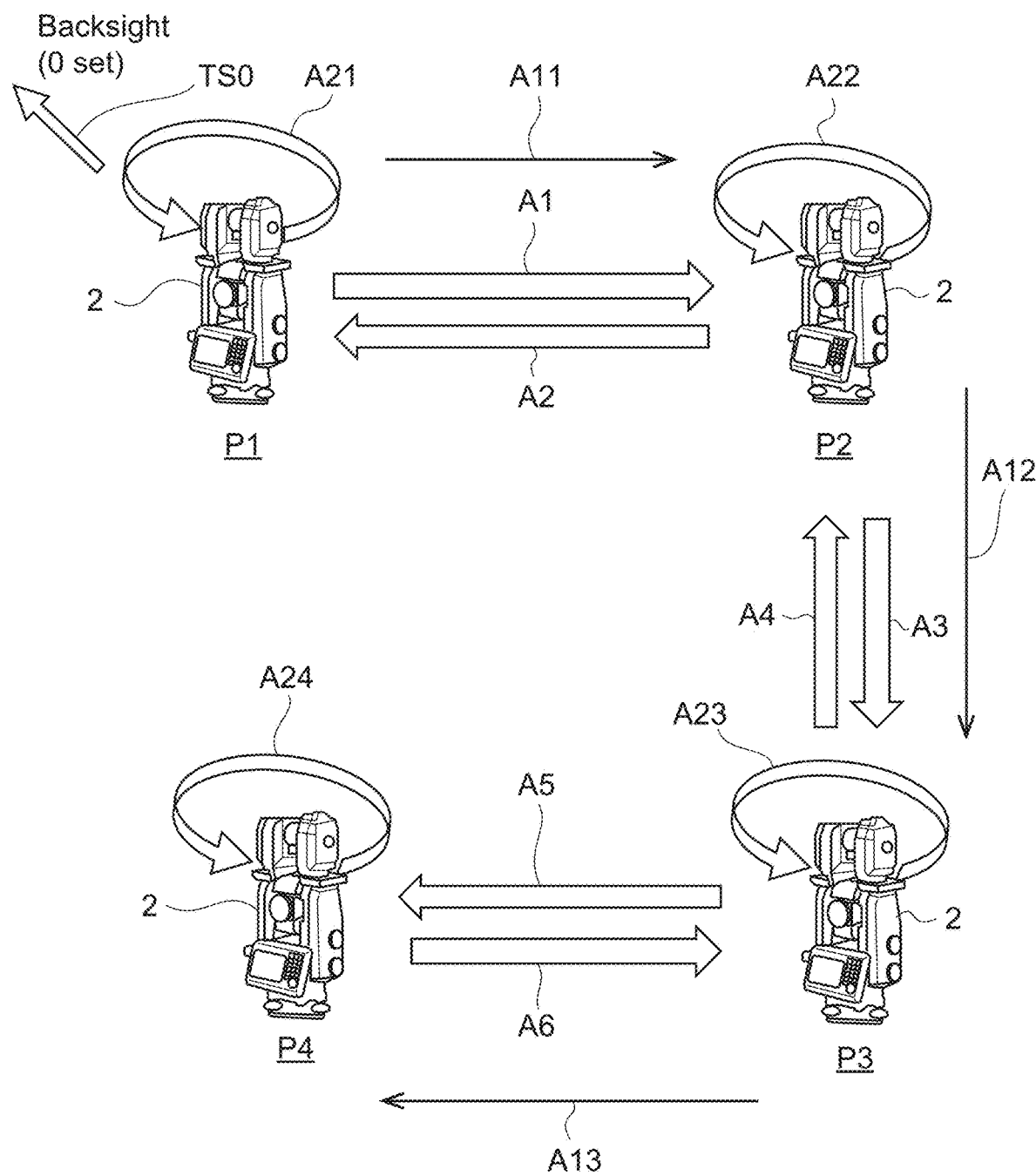
FIG. 11 is a schematic view for explaining operations of the three-dimensional survey apparatus according to the present embodiment at each position and movements among a plurality of positions.

FIG. 11 is a schematic view for explaining operations of the three-dimensional survey apparatus according to the present embodiment at each position and movements among a plurality of positions.

Figure 12:
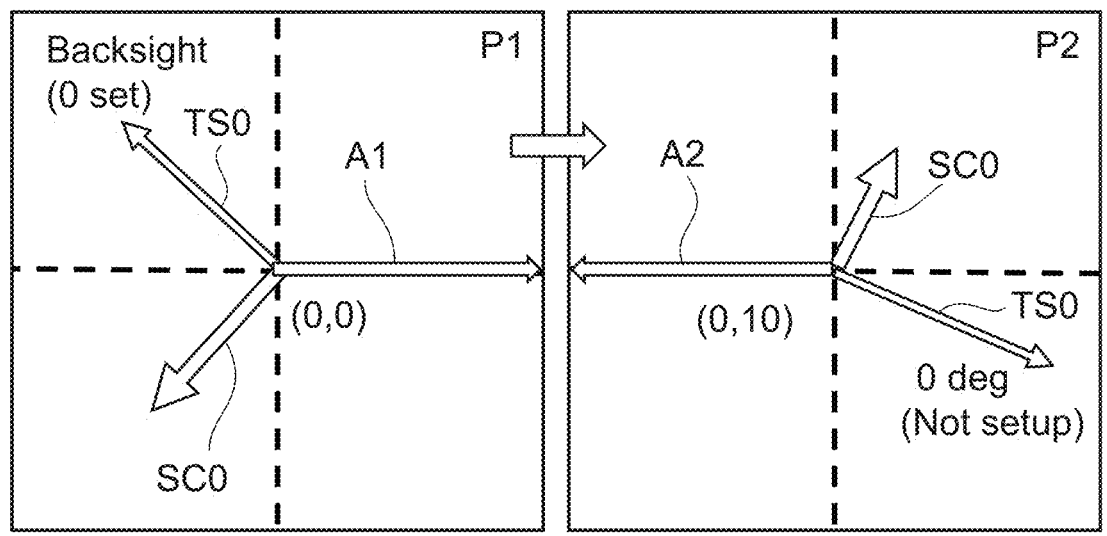
FIG. 12 is a schematic view for explaining a calculation method of coordinates of a machine reference point of a collimating ranging unit at a movement destination position.

FIG. 12 is a schematic view for explaining a calculation method of coordinates of a machine reference point of a collimating ranging unit at a movement destination position.

FIGS. 8 to 10 are, in other words, flow charts showing details of steps executed by the three-dimensional survey method according to the present embodiment and steps which the three-dimensional survey program according to the present embodiment causes a computer of the three-dimensional survey apparatus 2 to execute.

In the example described with reference to FIGS. 8 to 12, as depicted by arrows A11, A12, and A13 shown in FIG. 11, after starting acquisition of three-dimensional data of the measurement object 7 at the survey start position (the first survey position) P1, the three-dimensional survey apparatus 2 is moved to the second survey position P2, the third survey position P3, and the fourth survey position P4 in this order to acquire three-dimensional data of the measurement object 7 at the respective survey positions P2, P3, and P4.

First, referring to steps S21 to S28 shown in FIG. 8, a case where the three-dimensional survey apparatus 2 is moved from the survey start position P1 to the second survey position P2 and acquires three-dimensional data (point group data) of the measurement object 7 at each of the survey start position P1 and the second survey position P2 as depicted by the arrow A11 shown in FIG. 11 will be described. Therefore, in steps S21 to S28 shown in FIG. 8, the survey start position (the first survey position) P1 corresponds to the "movement source position" and the second survey position P2 corresponds to the "movement destination position".

As shown in FIG. 8, in step S21, the control calculation portion 46 of the three-dimensional survey apparatus 2 stores, in the storage portion 468, coordinates of a machine reference point of the collimating ranging unit 4 and a direction TS0 (refer to FIG. 11) of a reference collimation of the telescope portion 45 of the collimating ranging unit 4 at the survey start position P1 by a backsight using a backward intersection method or the like. Specifically, based on a distance from the collimating ranging unit 4 to the target of measurement 6 such as a prism, a vertical angle detected by the first vertical angle detector 444, and a horizontal angle detected by the first horizontal angle detector 434, the control calculation portion 46 calculates coordinates of a machine reference point of the collimating ranging unit 4 and a direction TS0 of a reference collimation of the telescope portion 45 of the collimating ranging unit 4 and stores the coordinates and the reference collimation in the storage portion 468. Note that, in step S21, the target of measurement 6 need not necessarily be used.

As shown in FIG. 12, when the direction TS0 of the reference collimation of the collimating ranging unit 4 is set by a backsight and stored, a relative angle between the direction TS0 of the reference collimation of the collimating ranging unit 4 and a direction SC0 of a reference collimation of the scanner unit 5 is determined. Specifically, the direction SC0 of the reference collimation of the scanner unit 5 is set and fixed in advance and the worker or the like cannot change settings of the direction SC0 of the reference collimation of the scanner unit 5. On the other hand, as described above with respect to step S21, once the direction TS0 of the reference collimation of the collimating ranging unit 4 is set by a backsight at the survey start position P1 and stored, the direction TS0 remains the same until once again set and stored. In other words, the worker or the like can once again set and store the direction TS0 of the reference collimation of the collimating ranging unit 4 by a backsight. Therefore, when the direction TS0 of the reference collimation of the collimating ranging unit 4 is set by a backsight and stored, the relative angle between the direction TS0 of the reference collimation of the collimating ranging unit 4 and the direction SC0 of the reference collimation of the scanner unit 5 enters a fixed state until the direction TS0 of the reference collimation of the collimating ranging unit 4 is once again set and stored. Accordingly, the control calculation portion 46 can calculate a rotational angle of the collimating ranging unit 4 (a rotational angle of a collimation of the telescope portion 45) at the plurality of survey positions P2, P3, and P4 with the survey start position P1 as a reference.

Next, in step S22, as depicted by the arrow A21 shown in FIG. 11, the control calculation portion 46 stores, in the storage portion 468, first point group data acquired at a movement source position (the survey start position P1) prior to moving the three-dimensional survey apparatus 2 by controlling the scanner unit 5.

Next, in step S23, the control calculation portion 46 stores a direction A1 (refer to FIG. 11) of a first collimation of the telescope portion 45 oriented from the movement source position (the survey start position P1) toward a movement destination position (the second survey position P2) after moving the three-dimensional survey apparatus 2. The direction A1 of the first collimation need not be a precise direction and may be a direction with rough accuracy. The telescope portion 45 is to be oriented from the movement source position (the survey start position P1) toward the movement destination position (the second survey position P2) by the worker or the like.

Next, in step S24, the worker or the like moves the three-dimensional survey apparatus 2 from the movement source position (the survey start position P1) to the movement destination position (the second survey position P2). Next, in step S25, the control calculation portion 46 stores a direction A2 (refer to FIG. 11) of a second collimation of the telescope portion 45 oriented from the movement destination position (the second survey position P2) toward the movement source position (the survey start position P1). The direction A2 of the second collimation need not be a precise direction and may be a direction with rough accuracy. The telescope portion 45 is to be oriented from the movement destination position (the second survey position P2) toward the movement source position (the survey start position P1) by the worker or the like.

In addition, in step S26, the control calculation portion 46 stores a first movement distance between the movement source position (the survey start position P1) and the movement destination position (the second survey position P2). The first movement distance need not be a precise distance and may be a distance with rough accuracy. For example, the first movement distance is input by the worker or the like in accordance with an operation by the worker or the like with respect to the operation inputting portion 472 (refer to FIG. 2). In this case, the worker or the like can readily input the first movement distance by performing an operation with respect to the operation inputting portion 472. For example, when the movement destination position (the second survey position P2) is a position that cannot be directly collimated from the movement source position (the survey start position P1), the worker or the like can input the first movement distance by an operation with respect to the operation inputting portion 472 without using the target of measurement 6 such as a prism.

Alternatively, for example, the first movement distance is calculated and automatically input by the first distance measuring portion 462 of the collimating ranging unit 4. The first distance measuring portion 462 is an example of the "distance measuring portion" according to the present invention. In this case, by performing collimation of the telescope portion 45 from the movement destination position (the second survey position P2) toward the movement source position (the survey start position P1), the worker or the like can readily input the first movement distance without having to manually input the first movement distance.

The processing of step S26 may be executed simultaneously with the processing of step S25 or may be executed between step S24 and step S25.

Next, in step S27, the control calculation portion 46 calculates and stores, in the storage portion 468, coordinates of the machine reference point of the collimating ranging unit 4 at the movement destination position (the second survey position P2) with the survey start position P1 as a reference based on the direction A1 of the first collimation, the direction A2 of the second collimation, and the first movement distance.

In other words, as described earlier with respect to step S21, the control calculation portion 46 can calculate a rotational angle of the collimating ranging unit 4 (a rotational angle of a collimation of the telescope portion 45) at the plurality of survey positions P2, P3, and P4 with the survey start position P1 as a reference. Therefore, as shown in FIG. 12, the control calculation portion 46 can calculate a relative angle between the direction A1 of the first collimation and the direction A2 of the second collimation. In addition, the control calculation portion 46 calculates a movement direction of the machine reference point of the collimating ranging unit 4 oriented from the movement source position (the survey start position P1) toward the movement destination position (the second survey position P2) based on the relative angle between the direction A1 of the first collimation and the direction A2 of the second collimation. Furthermore, the control calculation portion 46 calculates and stores, in the storage portion 468, coordinates of the machine reference point of the collimating ranging unit 4 at the movement destination position (the second survey position P2) with the survey start position P1 as a reference based on a movement direction of the machine reference point of the collimating ranging unit 4 and the first movement distance between the movement source position (the survey start position P1) and the movement destination position (the second survey position P2) (in other words, the first movement distance of the machine reference point of the collimating ranging unit 4). In the example shown in FIG. 12, coordinates of the machine reference point of the collimating ranging unit 4 at the survey start position P1 are (0, 0), and coordinates of the machine reference point of the collimating ranging unit 4 at the second survey position P2 are (0, 10).

Next, in step S28, as depicted by the arrow A22 shown in FIG. 11, the control calculation portion 46 stores, in the storage portion 468, second point group data acquired at the movement destination position (the second survey position P2) by controlling the scanner unit 5.

First, referring to steps S31 to S36 shown in FIG. 9, a case where the three-dimensional survey apparatus 2 is moved from the second survey position P2 to the third survey position P3 and acquires three-dimensional data (point group data) of the measurement object 7 at the third survey position P3 as depicted by the arrow A12 shown in FIG. 11 will be described. Therefore, in steps S31 to S36 shown in FIG. 9, the second survey position P2 corresponds to the "movement source position" and the third survey position P3 corresponds to the "movement destination position".

In step S31, the control calculation portion 46 stores a direction A3 (refer to FIG. 11) of a third collimation of the telescope portion 45 oriented from the movement source position (the second survey position P2) prior to moving the three-dimensional survey apparatus 2 toward the movement destination position (the third survey position P3) after moving the three-dimensional survey apparatus 2. The direction A3 of the third collimation need not be a precise direction and may be a direction with rough accuracy. The telescope portion 45 is to be oriented from the movement source position (the second survey position P2) toward the movement destination position (the third survey position P3) by the worker or the like.

Next, in step S32, the worker or the like moves the three-dimensional survey apparatus 2 from the movement source position (the second survey position P2) to the movement destination position (the third survey position P3). Next, in step S33, the control calculation portion 46 stores a direction A4 (refer to FIG. 11) of a fourth collimation of the telescope portion 45 oriented from the movement destination position (the third survey position P3) toward the movement source position (the second survey position P2). The direction A4 of the fourth collimation need not be a precise direction and may be a direction with rough accuracy. The telescope portion 45 is to be oriented from the movement destination position (the third survey position P3) toward the movement source position (the second survey position P2) by the worker or the like.

In addition, in step S34, the control calculation portion 46 stores a second movement distance between the movement source position (the second survey position P2) and the movement destination position (the third survey position P3). The second movement distance need not be a precise distance and may be a distance with rough accuracy. Input means of the second movement distance is as described earlier with respect to the input means of the first movement distance (refer to FIG. 8).

The processing of step S34 may be executed simultaneously with the processing of step S33 or may be executed between step S32 and step S33.

Next, in step S35, the control calculation portion 46 calculates and stores, in the storage portion 468, coordinates of the machine reference point of the collimating ranging unit 4 at the movement destination position (the third survey position P3) with the survey start position P1 as a reference based on the direction A3 of the third collimation, the direction A4 of the fourth collimation, and the second movement distance. A method (refer to FIG. 12) of calculating the coordinates of the machine reference point of the collimating ranging unit 4 at the movement destination position (the third survey position P3) with the survey start position P1 as a reference is as described earlier with respect to step S27 (refer to FIG. 8).

Next, in step S36, as depicted by the arrow A23 shown in FIG. 11, the control calculation portion 46 stores, in the storage portion 468, third point group data acquired at the movement destination position (the third survey position P3) by controlling the scanner unit 5.

Next, referring to steps S41 to S46 shown in FIG. 10, a case where the three-dimensional survey apparatus 2 is moved from the third survey position P3 to the fourth survey position P4 and acquires three-dimensional data (point group data) of the measurement object 7 at the fourth survey position P4 as depicted by the arrow A13 shown in FIG. 11 will be described. Therefore, in steps S41 to S46 shown in FIG. 10, the third survey position P3 corresponds to the "movement source position" and the fourth survey position P4 corresponds to the "movement destination position".

In step S41, the control calculation portion 46 stores a direction A5 (refer to FIG. 11) of a fifth collimation of the telescope portion 45 oriented from the movement source position (the third survey position P3) prior to moving the three-dimensional survey apparatus 2 toward the movement destination position (the fourth survey position P4) after moving the three-dimensional survey apparatus 2. The direction A5 of the fifth collimation need not be a precise direction and may be a direction with rough accuracy. The telescope portion 45 is to be oriented from the movement source position (the third survey position P3) toward the movement destination position (the fourth survey position P4) by the worker or the like.

Next, in step S42, the worker or the like moves the three-dimensional survey apparatus 2 from the movement source position (the third survey position P3) to the movement destination position (the fourth survey position P4). Next, in step S43, the control calculation portion 46 stores a direction A6 (refer to FIG. 11) of a sixth collimation of the telescope portion 45 oriented from the movement destination position (the fourth survey position P4) toward the movement source position (the third survey position P3). The direction A6 of the sixth collimation need not be a precise direction and may be a direction with rough accuracy. The telescope portion 45 is to be oriented from the movement destination position (the fourth survey position P4) toward the movement source position (the third survey position P3) by the worker or the like.

In addition, in step S44, the control calculation portion 46 stores a third movement distance between the movement source position (the third survey position P3) and the movement destination position (the fourth survey position P4). The third movement distance need not be a precise distance and may be a distance with rough accuracy. Input means of the third movement distance is as described earlier with respect to the input means of the first movement distance (refer to FIG. 8).

The processing of step S44 may be executed simultaneously with the processing of step S43 or may be executed between step S42 and step S43.

Next, in step S45, the control calculation portion 46 calculates and stores, in the storage portion 468, coordinates of the machine reference point of the collimating ranging unit 4 at the movement destination position (the fourth survey position P4) with the survey start position P1 as a reference based on the direction A5 of the fifth collimation, the direction A6 of the sixth collimation, and the third movement distance. A method (refer to FIG. 12) of calculating the coordinates of the machine reference point of the collimating ranging unit 4 at the movement destination position (the fourth survey position P4) with the survey start position P1 as a reference is as described earlier with respect to step S27 (refer to FIG. 8).

Next, in step S46, as depicted by the arrow A24 shown in FIG. 11, the control calculation portion 46 stores, in the storage portion 468, fourth point group data acquired at the movement destination position (the fourth survey position P4) by controlling the scanner unit 5. Next, the worker or the like performs an operation of stopping the acquisition of three-dimensional data by the three-dimensional survey apparatus 2 and ends the survey by the three-dimensional survey apparatus 2.

With the three-dimensional survey apparatus 2 according to the present embodiment, the control calculation portion 46 stores the coordinates of the machine reference point of the collimating ranging unit 4 at the survey start position P1 and the coordinates of the machine reference point of the collimating ranging unit 4 at movement destination positions (the second survey position P2, the third survey position P3, and the fourth survey position P4) with the survey start position P1 as a reference. Therefore, for example, another computer to which first point group data, second point group data, third point group data, and fourth point group data have been input can execute a simplified registration of the point group data. By executing a simplified registration of point group data, relative positions of a same location of the measurement object 7 and relative angles of an inclination of the measurement object 7 approximately match each other among a plurality of pieces of point group data acquired at a plurality of mutually different survey positions P1, P2, P3, and P4. In other words, a deviation between relative positions of a same location of the measurement object 7 and a deviation between relative angles of an inclination of the measurement object 7 among the plurality of pieces of point group data acquired at a plurality of mutually different survey positions P1, P2, P3, and P4 can be suppressed. Therefore, when executing a detailed registration of point group data, a situation where a relatively long processing time is necessary or the detailed registration of the point group data cannot be completed can be suppressed. Accordingly, the three-dimensional survey apparatus 2 according to the present embodiment can execute a registration of point group data in an efficient manner.

As described earlier with respect to FIGS. 3 to 7, a simplified registration of point group data and a detailed registration of point group data are not limited to being executed by another computer (for example, a personal computer) that differs from the three-dimensional survey apparatus 2 and may be executed by the control calculation portion 46 of the three-dimensional survey apparatus 2. In addition, the three-dimensional survey method and the three-dimensional survey program according to the present embodiment produce similar effects.

Next, an example of a result of an examination carried out by the present inventors will be described with reference to the drawings.

Figure 13:
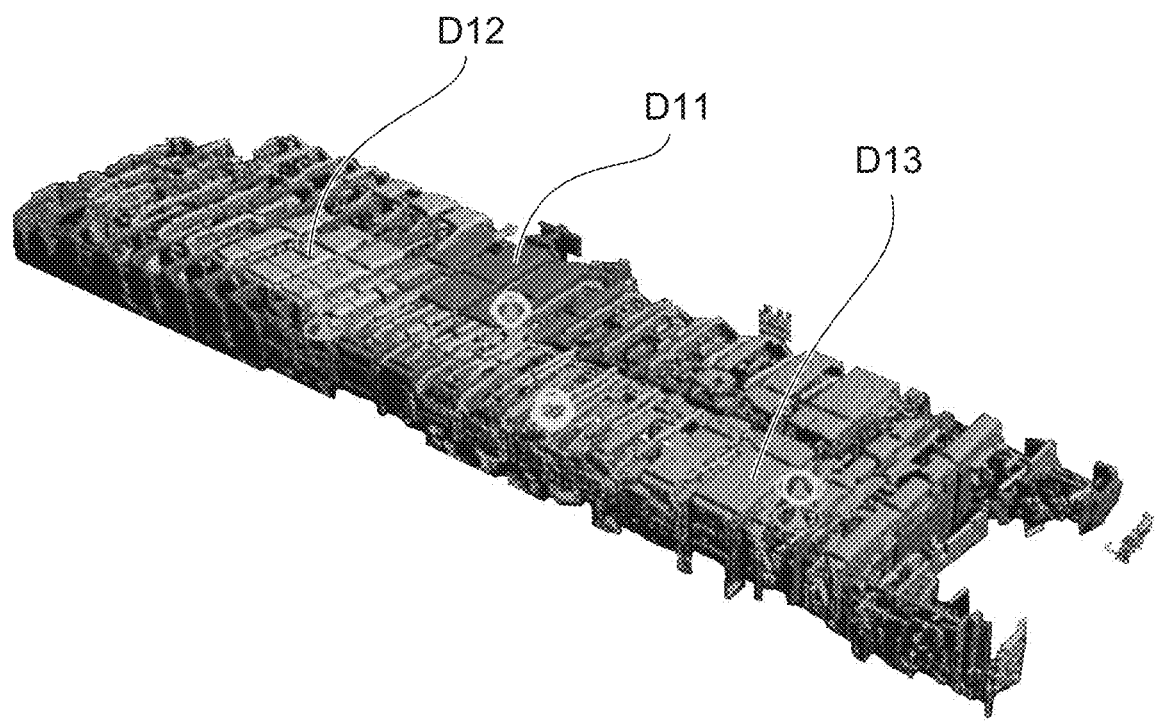
FIG. 13 is a schematic view which shows an example of a result of executing a simplified registration of point group data.

FIG. 13 is a schematic view which shows an example of a result of executing a simplified registration of point group data.

Figure 14:
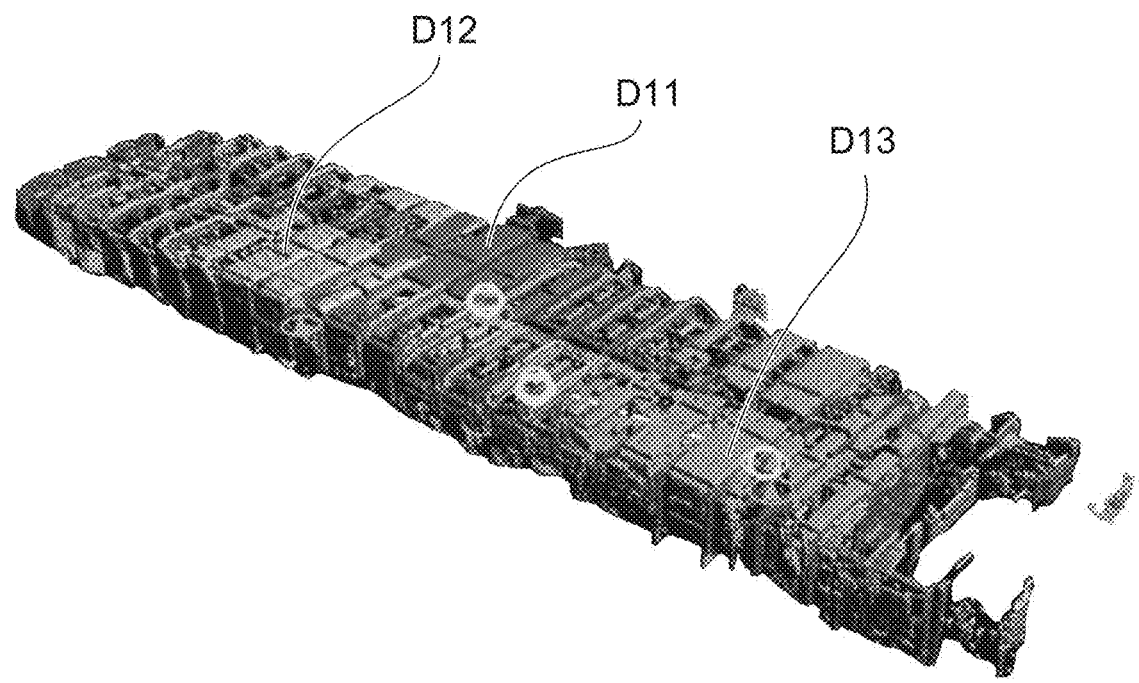
FIG. 14 is a schematic view which shows an example of a result of executing a detailed registration of point group data.

FIG. 14 is a schematic view which shows an example of a result of executing a detailed registration of point group data.

Figure 15:
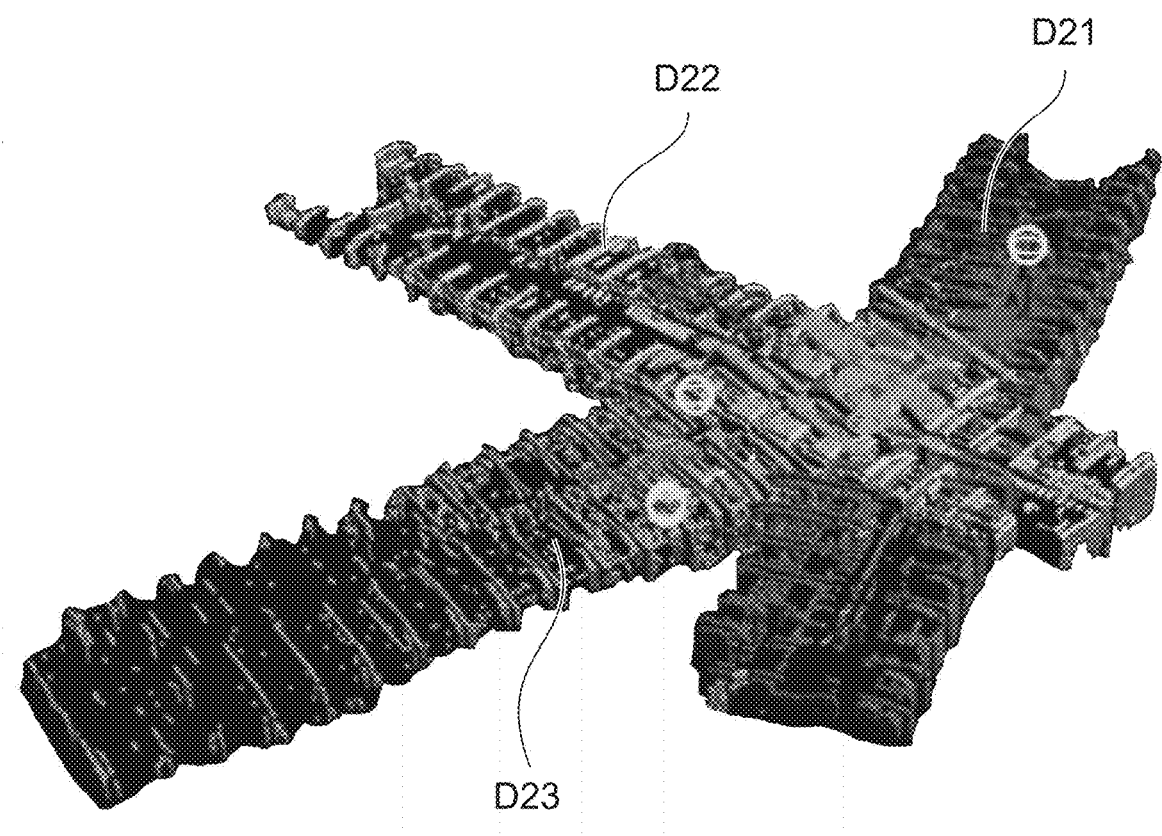
FIG. 15 is a schematic view which shows an example of a result of a comparative example.

FIG. 15 is a schematic view which shows an example of a result of a comparative example.

First, an example of a result of a comparative example will be described with reference to FIG. 15. FIG. 15 shows an example of a result of input of first point group data D21, second point group data D22, and third point group data D23 to another computer that differs from a three-dimensional survey apparatus. The first point group data D21, the second point group data D22, and the third point group data D23 are pieces of point group data acquired at a plurality of mutually different survey positions and do not include information that enables a registration of point group data to be automatically executed. In the comparative example shown in FIG. 15, even when the first point group data D21, the second point group data D22, and the third point group data D23 are input to another computer, since there is no information that enables a registration of point group data to be automatically executed, machine reference points of the collimating ranging unit 4 in each of the pieces of point group data D21, D22, and D23 concentrate at an origin of coordinates and, at the same time, rotation is not consistent among the pieces of point group data D21, D22, and D23.

As described above, in the present comparative example, since operations and processing of the present embodiment described earlier are not executed with respect to FIGS. 3 to 12, a deviation between relative positions of a same location of the measurement object 7 and a deviation between relative angles of an inclination of the measurement object 7 among the first point group data D21, the second point group data D22, and the third point group data D23 are large. In this case, a registration of point group data may be incompletable or completing the registration of point group data may require that relative positions of a same location of the measurement object 7 and relative angles of an inclination of the measurement object 7 among the first point group data D21, the second point group data D22, and the third point group data D23 be manually aligned to a certain degree.

In contrast, when the first point group data D11, the second point group data D12, and the third point group data D13 acquired by executing the operations and processing of the present embodiment described earlier with respect to FIGS. 3 to 12 are input to another computer that differs from a three-dimensional survey apparatus, the other computer automatically executes a simplified registration of the first point group data D11, the second point group data D12, and the third point group data D13. The first point group data D11, the second point group data D12, and the third point group data D13 are pieces of point group data acquire at a plurality of mutually different survey positions (for example, the survey start position (the first survey position) P1, the second survey position P2, and the third survey position P3 described earlier with respect to FIGS. 8 to 12).

Accordingly, as shown in FIG. 13, relative positions of a same location of the measurement object 7 and relative angles of an inclination of the measurement object 7 approximately match each other among the first point group data D11, the second point group data D12, and the third point group data D13. In other words, in the example of the result shown in FIG. 13, a deviation between relative positions of a same location of the measurement object 7 and a deviation between relative angles of an inclination of the measurement object 7 are suppressed among the first point group data D11, the second point group data D12, and the third point group data D13 acquired at a plurality of mutually different survey positions.

Therefore, as shown in FIG. 14, when executing a detailed registration of the first point group data D11, the second point group data D12, and the third point group data D13, a situation where a relatively long processing time is necessary or the detailed registration of the point group data cannot be completed can be suppressed. For example, the detailed registration of the first point group data D11, the second point group data D12, and the third point group data D13 is executed by inputting prescribed operations to another computer. As shown in FIGS. 13 and 14, a result of a detailed registration of the first point group data D11, the second point group data D12, and the third point group data D13 approximates a result of a simplified registration of the first point group data D11, the second point group data D12, and the third point group data D13. Accordingly, the present inventors were able to confirm that the three-dimensional survey apparatus 2 according to the present embodiment can execute a registration of point group data in an efficient manner.

An embodiment of the present invention has been described above. However, it is to be understood that the present invention is not limited to the embodiment described above and that various modifications can be made without departing from the scope of the appended claims. The configurations of the embodiment described above can be partially omitted or arbitrarily combined in manners that differ from those described above.

What is claimed is:

1. A three-dimensional survey apparatus which acquires three-dimensional data of a measurement object, the three-dimensional survey apparatus comprising:
   a collimating ranging unit which irradiates the measurement object with first ranging light by collimation of a telescope portion to measure a distance to the measurement object and to detect a direction of the collimation;
   a scanner unit which is integrally provided with the collimating ranging unit and rotatably provided relative to the collimating ranging unit and which acquires point group data with respect to the measurement object by performing rotational irradiation with second ranging light to measure a distance to the measurement object and to detect an irradiation direction of the second ranging light; and
   a control calculation portion which is provided in at least one of the collimating ranging unit and the scanner unit, wherein
      the control calculation portion stores coordinates of a machine reference point of the collimating ranging unit and a direction of a reference collimation of the telescope portion by a backsight at a survey start position, stores first point group data acquired at a movement source position by controlling the scanner unit, stores a direction of a first collimation of the telescope portion oriented from the movement source position toward a movement destination position, stores a direction of a second collimation of the telescope portion oriented from the movement destination position toward the movement source position and a movement distance between the movement source position and the movement destination position, calculates and stores coordinates of the machine reference point at the movement destination position with the survey start position as a reference based on the direction of the first collimation, the direction of the second collimation, and the movement distance, and stores second point group data acquired at the movement destination position by controlling the scanner unit.

2. The three-dimensional survey apparatus according to claim 1, wherein
the collimating ranging unit has an operation inputting portion which transmits information input by an operation to the control calculation portion, and
the movement distance is a distance input by a worker in accordance with an operation by the worker with respect to the operation inputting portion.

3. The three-dimensional survey apparatus according to claim 1, wherein
the control calculation portion has a distance measuring portion which calculates a distance to the measurement object based on reflected ranging light that is the first ranging light having been reflected by the measurement object, and
the movement distance is a distance calculated and input by the distance measuring portion.

4. A three-dimensional survey method executed by a three-dimensional survey apparatus which includes:
a collimating ranging unit which irradiates a measurement object with first ranging light by collimation of a telescope portion to measure a distance to the measurement object and to detect a direction of the collimation;
a scanner unit which is integrally provided with the collimating ranging unit and rotatably provided relative to the collimating ranging unit and which acquires point group data with respect to the measurement object by performing rotational irradiation with second ranging light to measure a distance to the measurement object and to detect an irradiation direction of the second ranging light; and
a control calculation portion which is provided in at least one of the collimating ranging unit and the scanner unit,
the three-dimensional survey apparatus acquiring three-dimensional data of the measurement object,
wherein the three-dimensional survey method comprises the steps of:
storing coordinates of a machine reference point of the collimating ranging unit and a direction of a reference collimation of the telescope portion by a backsight at a survey start position;
storing first point group data acquired at a movement source position by controlling the scanner unit;
storing a direction of a first collimation of the telescope portion oriented from the movement source position toward a movement destination position;
storing a direction of a second collimation of the telescope portion oriented from the movement destination position toward the movement source position and a movement distance between the movement source position and the movement destination position;
calculating and storing coordinates of the machine reference point at the movement destination position with the survey start position as a reference based on the direction of the first collimation, the direction of the second collimation, and the movement distance; and
storing second point group data acquired at the movement destination position by controlling the scanner unit.

5. A three-dimensional survey program executed by a computer of a three-dimensional survey apparatus which includes:
a collimating ranging unit which irradiates a measurement object with first ranging light by collimation of a telescope portion to measure a distance to the measurement object and to detect a direction of the collimation;
a scanner unit which is integrally provided with the collimating ranging unit and rotatably provided relative to the collimating ranging unit and which acquires point group data with respect to the measurement object by performing rotational irradiation with second ranging light to measure a distance to the measurement object and to detect an irradiation direction of the second ranging light; and
a control calculation portion which is provided in at least one of the collimating ranging unit and the scanner unit,
the three-dimensional survey apparatus acquiring three-dimensional data of the measurement object, wherein
the three-dimensional survey program causes the computer to execute the steps of:
storing coordinates of a machine reference point of the collimating ranging unit and a direction of a reference collimation of the telescope portion by a backsight at a survey start position;
storing first point group data acquired at a movement source position by controlling the scanner unit;
storing a direction of a first collimation of the telescope portion oriented from the movement source position toward a movement destination position;
storing a direction of a second collimation of the telescope portion oriented from the movement destination position toward the movement source position and a movement distance between the movement source position and the movement destination position;
calculating and storing coordinates of the machine reference point at the movement destination position with the survey start position as a reference based on the direction of the first collimation, the direction of the second collimation, and the movement distance; and
storing second point group data acquired at the movement destination position by controlling the scanner unit.

* * * * *